United States Patent
Harada et al.

(10) Patent No.: US 12,497,530 B2
(45) Date of Patent: Dec. 16, 2025

(54) ACTIVE ENERGY RAY POLYMERIZATION INITIATOR, ACTIVE ENERGY RAY CURING COMPOSITION, ACTIVE ENERGY RAY CURING INK, AQUEOUS ACTIVE ENERGY RAY CURING INK, CONTAINER, IMAGE FORMING DEVICE, IMAGE FORMING METHOD, AND METHOD OF MANUFACTURING ACTIVE ENERGY RAY POLYMERIZATION INITIATOR

(71) Applicants: Shigeyuki Harada, Shizuoka (JP); Yuya Hirokawa, Kanagawa (JP)

(72) Inventors: Shigeyuki Harada, Shizuoka (JP); Yuya Hirokawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 821 days.

(21) Appl. No.: 17/810,414

(22) Filed: Jul. 1, 2022

(65) Prior Publication Data

US 2023/0032881 A1 Feb. 2, 2023

(30) Foreign Application Priority Data

Jul. 5, 2021 (JP) .................... 2021-111295

(51) Int. Cl.
*C09D 11/38* (2014.01)
*C09D 11/03* (2014.01)
(Continued)

(52) U.S. Cl.
CPC .............. *C09D 11/38* (2013.01); *C09D 11/03* (2013.01); *C09D 11/101* (2013.01); *C09D 11/30* (2013.01); *C09D 181/00* (2013.01)

(58) Field of Classification Search
CPC ......... C09D 11/03; C09D 11/30; C09D 11/38; C09D 11/101; C09D 181/00
See application file for complete search history.

(56) References Cited

U.S. PATENT DOCUMENTS

2016/0168292 A1 6/2016 Fukuoka et al.
2022/0056298 A1 2/2022 Umemura et al.
(Continued)

FOREIGN PATENT DOCUMENTS

CN 101759814 A * 6/2010
CN 102250059 A * 11/2011
(Continued)

*Primary Examiner* — Sophie Hon
(74) *Attorney, Agent, or Firm* — Grüneberg and Myers PLLC

(57) ABSTRACT

An active energy ray polymerization initiator has a structure of Chemical Formula (1) or (2),

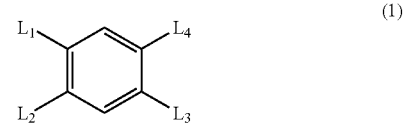

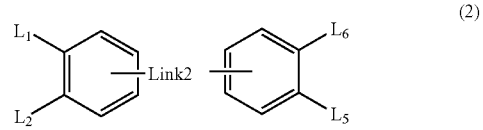

$L_1$ represents Chemical Formula (I), $L_2$ represents Chemical Formula (II), one of $L_3$ and $L_4$ and one of $L_5$ and $L_6$ represent the same group as $L_1$, the rest of $L_3$ and $L_4$ and one of $L_5$ and $L_6$ represent the same group as $L_2$, Link 2 represents a single bond, —O—, —CO—, —SO$_2$—, —C(CF$_3$)$_2$—, an aliphatic hydrocarbon group having 1 to 12 carbon atoms, or an aromatic group having 6 to 15 carbon atoms, (Continued)

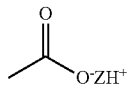

(I)

Z represents a tertiary amine.

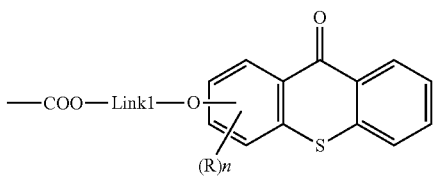

(II)

R represents a hydrocarbon group having one to three carbon atoms or methoxy group, n represents 0 or an integer of from 1 to 3, Link 1 represents —$(CH_2)_x$—$(OC_2H_4)_y$—, where x represents an integer of from 2 to 12 and y represents 0 or an integer of from 1 to 11.

9 Claims, 7 Drawing Sheets

(51) Int. Cl.
  C09D 11/101 (2014.01)
  C09D 11/30 (2014.01)
  C09D 181/00 (2006.01)

(56) References Cited

U.S. PATENT DOCUMENTS

| | | |
|---|---|---|
| 2022/0056299 A1 | 2/2022 | Yamamoto et al. |
| 2022/0118774 A1 | 4/2022 | Saiga et al. |
| 2022/0126605 A1 | 4/2022 | Saiga et al. |
| 2022/0169034 A1 | 6/2022 | Hagiwara et al. |

FOREIGN PATENT DOCUMENTS

| | | | | |
|---|---|---|---|---|
| CN | 108586639 A | * | 9/2018 | ........... C07D 335/16 |
| EP | 0 224 967 A1 | | 6/1987 | |
| JP | 2009-244745 | | 10/2009 | |
| JP | 2016-185929 | | 10/2016 | |
| JP | 2016185929 A | * | 10/2016 | |
| JP | 2022-054914 | | 4/2022 | |

* cited by examiner

ACTIVE ENERGY RAY POLYMERIZATION INITIATOR, ACTIVE ENERGY RAY CURING COMPOSITION, ACTIVE ENERGY RAY CURING INK, AQUEOUS ACTIVE ENERGY RAY CURING INK, CONTAINER, IMAGE FORMING DEVICE, IMAGE FORMING METHOD, AND METHOD OF MANUFACTURING ACTIVE ENERGY RAY POLYMERIZATION INITIATOR

CROSS-REFERENCE TO RELATED APPLICATIONS

This patent application is based on and claims priority pursuant to 35 U.S.C. § 119 to Japanese Patent Application No. 2021-111295, filed on Jul. 5, 2021, in the Japan Patent Office, the entire disclosure of which is hereby incorporated by reference herein.

BACKGROUND

Technical Field

The present disclosure relates to an active energy ray polymerization initiator, an active energy ray curing composition, an active energy ray curing ink, an aqueous active energy ray curing ink, a container, an image forming device, an image forming method, and a method of manufacturing an active energy ray polymerization initiator.

Description of the Related Art

The use of a volatile organic compound raises a general concern about air pollution and is legally restricted in some cases. For this reason, an aqueous ink composition mainly containing water as a vehicle is needed as printing ink.

Aqueous inks mostly contain a thermoplastic resin emulsion. The resin emulsion forms a film at drying with heat, thereby fixing a created image onto a medium. The image is required to be durable against beading during printing, beading caused by contact with ethanol after image forming, and physical scratching and abrasion. To enhance the durability, an aqueous ink is used that contains at least one of a water-soluble monomer, a water-soluble oligomer, and a resin emulsion, which are polymerizable at exposure to active energy radiation such as electron beams and ultraviolet (UV), and a water-soluble active energy ray polymerization initiator that generates a free radical at exposure to active energy radiation.

The light source of active energy radiation is preferably a UV light-emitting diode that emits light from 350 to 400 nm to save energy and space.

SUMMARY

According to embodiments of the present disclosure, an active energy ray polymerization initiator is provided which has a structure 1 represented by the Chemical Formula (1) below or structure 2 represented by the Chemical Formula (2) below,

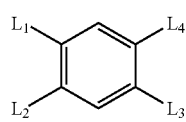

Chemical Formula (1)

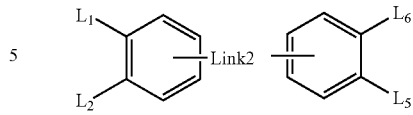

Chemical Formula (2)

where $L_1$ represents a group represented by the following Chemical Formula (I), $L_2$ represents a group represented by the following Chemical Formula (II), one of $L_3$ and $L_4$ represents the same group as $L_1$, the rest of $L_3$ and $L_4$ represents the same group as $L_2$, one of $L_5$ and $L_6$ represents the same group as $L_1$, the rest of $L_5$ and $L_6$ represents the same group as $L_2$, Link 2 represents a single bond, —O—, —CO—, —SO$_2$—, —C(CF$_3$)$_2$—, an aliphatic hydrocarbon group having 1 to 12 carbon atoms, or an aromatic group having 6 to 15 carbon atoms,

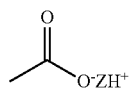

Chemical Formula (I)

where Z represents a tertiary amine,

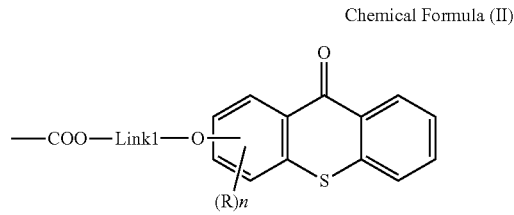

Chemical Formula (II)

where R represents a hydrocarbon group having one to three carbon atoms or methoxy group, n represents 0 or an integer of from 1 to 3, Link 1 represents —(CH$_2$)$_x$—(OC$_2$H$_4$)$_y$—, where x represents an integer of from 2 to 12 and y represents 0 or an integer of from 1 to 11.

As another aspect of embodiments of the present disclosure, a method of manufacturing an active energy ray polymerization initiator is provided which includes synthesizing the active energy ray polymerization initiator from a thioxanthone compound represented by the following Chemical Formula (3), an aromatic tetracarboxylic acid, and a tertiary amine,

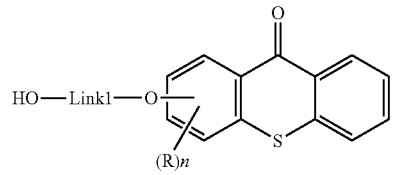

Chemical Formula (3)

where R represents a hydrocarbon group having one to three carbon atoms or methoxy group, n represents 0 or an integer of from 1 to 3, Link 1 represents —(CH$_2$)$_x$—(OC$_2$H$_4$)$_y$—, where x represents an integer of from 2 to 12 and y represents 0 or an integer of from 1 to 11.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
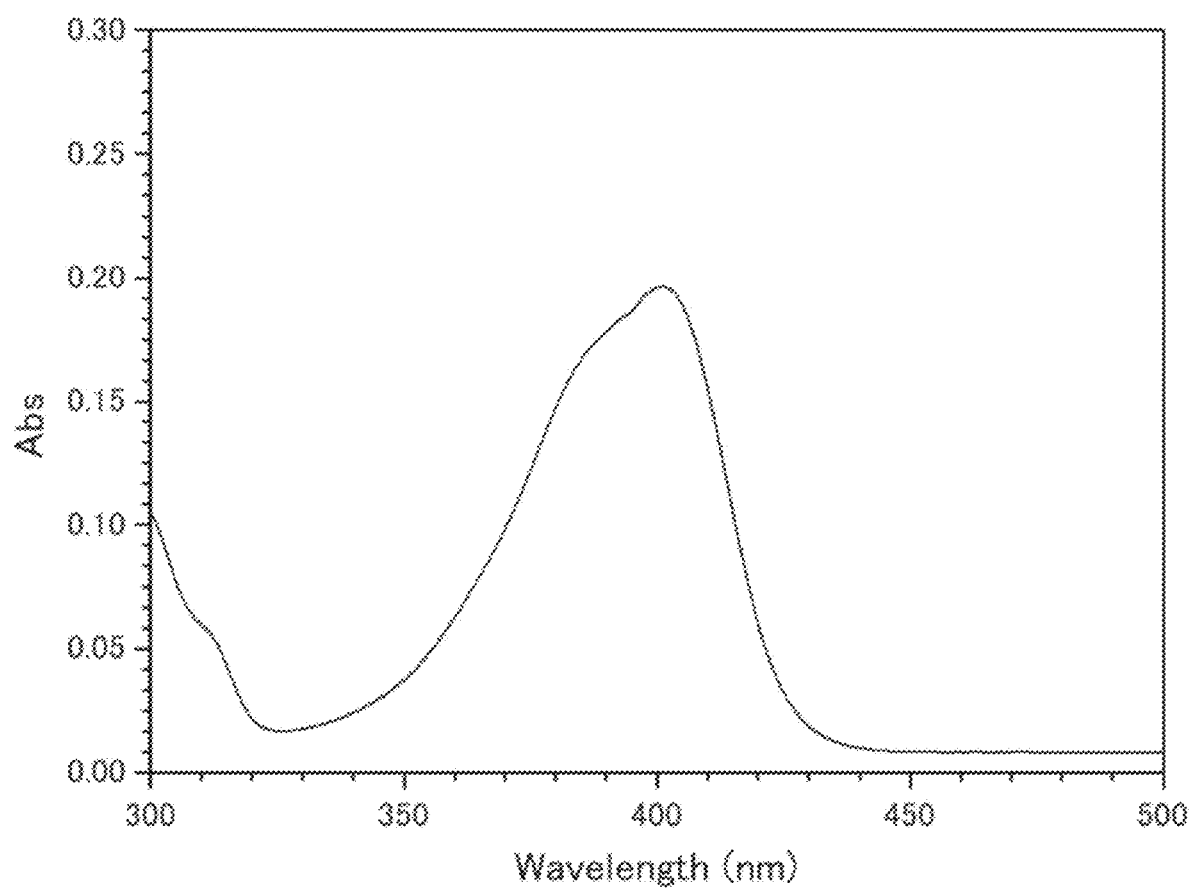
FIG. 1 is a graph illustrating an example of absorption spectrum of the active energy ray polymerization initiator according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

The terms of image forming, recording, and printing in the present disclosure represent the same meaning.

Also, recording media, media, and print substrates in the present disclosure have the same meaning unless otherwise specified.

According to the present disclosure, an active energy ray polymerization initiator is provided which is highly sensitive having a peak wavelength in a range of from 350 to 400 nm and demonstrates high water-solubility.

Embodiments of the present disclosure are described in detail below, but the present disclosure is not limited thereto.

Active Energy Ray Polymerization Initiator

In the present disclosure, the active energy ray polymerization initiator means a material for generating a free radical at exposure to active energy radiation to initiate polymerization reaction. The active energy ray is not particularly limited as long as energy required to allow polymerization reaction. It includes ultraviolet (UV), electron beams, α ray, β ray, and γ ray. Of these, UV is preferable. A device such as a UV light emitting diode (LED) and UV laser diode (LD) can emit UV.

The active energy ray polymerization initiator of the present disclosure has a structure represented by the following Chemical Formula (1) or Chemical Formula (2).

Chemical Formula (1)

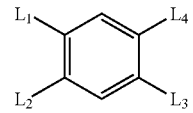

Chemical Formula (2)

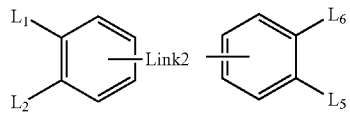

In Chemical Formula (1) or Chemical Formula (2), $L_1$ represents a group represented by the following Chemical Formula (I).

Chemical Formula (I)

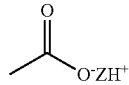

In Chemical Formula (I), Z represents a tertiary amine. The ion bond represented by —O—ZH$^+$ in the Chemical Formula (I) containing this tertiary amine imparts water solubility to an active energy ray polymerization initiator. The tertiary amine is detailed later.

In Chemical Formula (1) or Chemical Formula (2), $L_2$ represents a group represented by the following formula (II).

Chemical Formula (II)

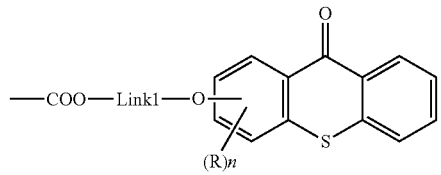

In Chemical Formula (II), R represents a hydrocarbon group having one to three carbon atoms or a methoxy group having one to three carbon atoms.

The symbol "n" represents 0 or an integer of from 1 to 3.

In Chemical Formula (II), Link 1 represents —$(CH_2)_x$—$(OC_2H_4)_y$—. "x" represents an integer of from 2 to 12 and "y" represents 0 or an integer of from 1 to 11. Link 1 is a structure having an alkylene group or a structure having an alkylene group and a polyoxy group. The structure having an alkylene group and a polyoxy group, i.e., y is 1 or greater, is preferable to impart water solubility to an active energy ray polymerization initiator.

In Chemical Formula (1), one of $L_3$ and $L_4$ represents the same group as $L_1$ and the other of $L_3$ and $L_4$ represents the same group as $L_2$.

In Chemical Formula (2), one of $L_5$ and $L_6$ represents the same group as $L_1$ and the rest of $L_5$ and $L_6$ represents the same group as $L_2$.

In Chemical Formula (2), Link 2 represents an atomic bond (or single bond), —O—, —CO—, —$SO_2$—, —$C(CF_3)_2$, an aliphatic hydrocarbon group having 1 to 12 carbon atoms, or an aromatic group having 6 to 15 carbon atoms.

The active energy ray polymerization initiator having a structure represented by Chemical Formula (1) or Chemical Formula (2) absorbs light at the thioxanthone site having an alkyl group represented by —$(R)_n$ and an alkoxy group represented by —O-link 1— in Chemical Formula (II). The initiator pulls out hydrogen within itself or from a compound other than the initiator, thereby generating a free radical. Pulling out hydrogen at the thioxanthone site is likely to occur at the hydrocarbon adjacent to a nitrogen atom first. The hydrocarbon adjacent to the nitrogen atom of the tertiary amine represented by Z of Chemical Formula (I) is thus effective.

—O-Link 1 group in the Chemical Formula (II) of the active energy ray polymerization initiator having a structure represented by Chemical Formula (1) or Chemical Formula (2) is preferably bonded at the site 2, site 3, or site 4 of the thioxanthone structure represented by the following Chemical Formula (III). When —O-Link 1 group is bonded at the site 2, site 3, or site 4, carbonyl oxygen is not present at the adjacent site unlike the case where —O-Link 1 group is bonded at the site 1. Therefore, the carbonyl oxygen generated by the mutual action between the carbonyl oxygen and —O-Link 1 group is not likely to be bonded with the pulled-out hydrogen, which leads to an increase in the production efficiency of radicals.

Chemical Formula (III)

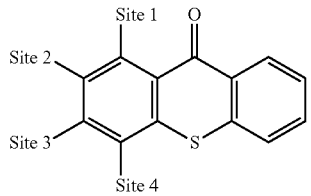

Specific examples of the tertiary amine represented by Z of Chemical Formula (I) include, but are not limited to, triethylamine, N,N-dimethyl ethylamine, N,N-dimethyl propane-1-amine, N,N-dimethyl isopropyl amine. N,N-dimethyl allylamine, N,N-dimethyl formamide dimethylacetal, N-butyl dimethylamine, (dimethylamino)acetoaldehyde dimethyl acetal, N,N-dimethyl cyclohexylamine, N,N-dimethyl-n-octylamine, N,N-dimethyl decylamine, N,N-dimethide decylamine. N,N-dimethyl tetra decylamine, N,N-dimethyl hexadctyl amine, N,N-dimethyl-n-octadecyl amine, N,N-diethyl methylamine, didecyl methylamine, N-methyldi-n-octylamine. N,N-didodecyl methylamine, N,N-diisopyl ethylamine. N,N-dipropyl ethylamine, N,N-diethyl glycine methyl ester, tripropyl amine, tri-isobutyl amine, 1-(2-methoxyethyl)piperazine, 4-isobutyl morpholine, 4-butyl morpholine, 4-(3-chloropropyl)morpholine, N,N-dibenzyl glycine ethyl ester, 3-(morphplino)propnic acid ethylester, 4-[2,2,2-trifluoro-1-[(trimethylsilyl)oxy]ethyl]morpholine, 2-(dimethylamino)ethanol, 3-(dimethylamino)-1-propanol, 1-dimethylamino-2-propanol, 2-(Dimethylamino)-2-methyl-1-propanol, 2-diethylamonoethanol, 3-diethylamino-1-propanol, 1-dimethylamino-2-propanol, 2-(dimethylamino)-2-methyl-1-propanol, 2-diethylaminoethanol, 3-diethylamino-1-propanol, 1-(diethyl)-1,2-propane diol, 2-[2-(Diethyl)-1,2-propane diol, 2-[2[(diethylamino)ethoxy]ethanol, 2-(N-ethylanilino)ethanol, 1-ethyl-3-pyridinol, (R)-1-benzyl-3-pyridinol, (S)-1-benzyl-3-pyridinol, 1-benzyl-3-pyrodinol, 1-ethyl-3-hydroxy piperidine, (R)-1-benzyl-3-hydroxy piperidine, I-benzyl-3-hydroxy piperidine, 2-(diisopropylamino)ethanol, 2-(di-isopropylamino)ethanol, 1-isopropyl-3-pyridinol, 2-(dibutylamino)ethanol, N,N-dibenzyl-2-aminoethanol, 4-(2-hydroxydiethyl)morpholine, N-(2-hydroxypropyl)morphpline, N-(2-hydroxypropyl)morphpline, 1-(2-hydroxyethyl)pyrrolidine, 1-piperazine ethanol, 1-(2-hydroxyethyl)-2-pyrrolidone, 1-(3-hydroxyethyl)aniline, N-ethyl-N-2-hydroxyethyl-m-toluidine, 1-[2-(hydroxyethoxy)ethyl)piperazine, 4(3-hydroxypropyl)morpholine, N-methyldiethanol amine, N-ethyldietanol amine, N-t-butyl diethanol amine, N-butyl dioethanol amine, bis(2-hydroxyethyl)amino tris(hydroxymethyl)methane. N-lauryl diethanol amine, stearyldiethanol amine, N-phenyl diethanol amine, N-benzyl diethanol amine, p-toluic diethanol amine, m-toluic diethanol amine, N,N-bis(2-hydroxyethyl)-3-chloroaniline. N,N-bis(2-hydroxypropyl)aniline, 1-(2-hydroxyethyl)-4-(3-hydroxypropyl)piperazine, 4-hydroxy-1-(2-hydroxyethyl)-2,2-6,6-tetramethyl piperazine, 3-morpholino-1,2-propane diol, triethanol amine, 1-[bis(2-oxyethyl)amino:−2-propanol, N-(3-aminopropyl)diethanol amine, 4-dimethyl aminobutylonitrile, 3-dimethylamino propionitrile, diethyl aminoacetonitril, morpholino acetonitril, N-(2-cyanoethyl)morpholine, N,N-dimethyl ethylene diamine, N,N,N'-trimethyl ethylene diamine, N,N-dimethyl-1,3-propane diamine, N,N,2,2-tetramethyl-1,3-propane diamine, N,N-diethylene diamine, N,N-diethyl-N'-methylethylene diamine, N,N,N'-triethyethylene diamine, N,N-diethyl-1,3-diaminopropane. N,N-diisopropyl ethylene diamine, N,N-dibutyl ethylene diamine, 3-(dibutylamino)propylamine, 2,2'-diamino-N-methyldiethyl amine, N,N',N'-trimethyl diethylene triamine, 3,3'-diamino-N-methyldipropyl amine, tris(2-aminoethyl)amine, tris(3-aminopropyl)amine, N-(3-aminopropyl)morpholine, and 4-(2-aminoethyl)morpholine.

The maximum absorption wavelength (λmax) of the active energy ray polymerization initiator having the structure represented by the Chemical Formula (1) or Chemical Formula (2) is preferably 350 nm or greater, more preferably 360 nm or greater, furthermore preferably 370 nm or greater, and particularly preferably 380 nm or greater. The λmax is preferably 450 nm or less, more preferably 440 nm or less, furthermore preferably 430 nm or less, and particularly preferably 420 nm or less. When the active energy ray polymerization initiator has λmax in the range mentioned above, the initiator is fully sensitive to active energy radiation emitted from a UV-LED light source having a peak wavelength in a range of fro 350 to 400 nm. To enhance the sensitivity of the active energy ray polymerization initiator, the peak wavelength emitted from a UV-LED light source is preferably from 360 to 400 nm, more preferably from 380 to 400 nm, and further more preferably from 390 to 400 nm.

One way of measuring the λmax of an active energy ray polymerization initiator is to dissolve an active energy ray polymerization initiator in methylene chloride at 50 ppm followed by measuring the absorption spectrum of this solution by a spectrophotometer for ultraviolet, visible light, and near infrared, V-680, manufactured by JASCO Corporation.

The active energy ray polymerization initiator having a structure represented by Chemical Formula (1) or Chemical Formula (2) has water solubility as described above. The active energy ray polymerization initiator can be thus preferably used when it is required to be water-soluble.

"Having water solubility" in the present disclosure means when an active energy ray polymerization initiator is added to a liquid mixture at 20 degrees obtained by mixing deionized water and methanol at 1:1 on a mass basis, the initiator is dissolved at 1.5 percent by mass or more to the mass of the liquid mixture, preferably 5.0 percent by mass or more.

Method of Manufacturing Active Energy Ray Polymerization Initiator

The active energy ray polymerization initiator of the present disclosure is synthesized by using at least the thioxanthone compound represented by the following Chemical Formula (3), an aromatic tetracarboxylic acid, and a tertiary amine. The method of manufacturing an active energy ray polymerization initiator includes: involving a reaction between at least the thioxanthone compound represented by the following Chemical Formula (3) and an aromatic tetracarboxylic acid to obtain an intermediate; and allowing the intermediate to react with a tertiary amine to obtain the active energy ray polymerization initiator represented by Chemical Formula (1) or Chemical Formula (2).

Chemical Formula (3)

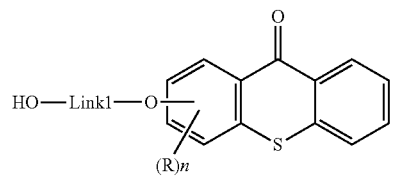

In Chemical Formula (3), R represents a hydrocarbon group having one to three carbon atoms or a methoxy group having one to three carbon atoms.

The symbol "n" represents 0 or an integer of from 1 to 3.

Link 1 represents —$(CH_2)_x$—$(OC_2H_4)_y$—. "x" represents an integer of from 2 to 12 and "y" represents 0 or an integer of from 1 to 11. Link 1 is a structure having an alkylene group or a structure having an alkylene group and a polyoxy group. The structure having an alkylene group and a polyoxy group, i.e., y is 1 or greater, is preferable to impart water solubility to the active energy ray polymerization initiator manufactured by the Chemical Formula (3).

The aromatic tetra carboxylic acid is preferably an aromatic tetracarboxylic acid dihydride, which is readily synthesized.

Specific examples of the aromatic tetra carboxylic acid include, but are not limited to, the following compounds.

Compound 1

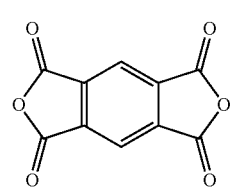

Compound 2

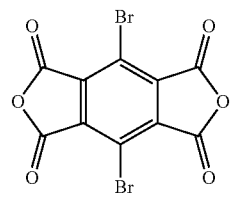

Compound 3

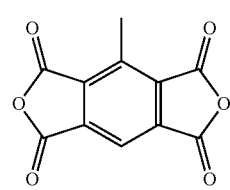

Compound 4

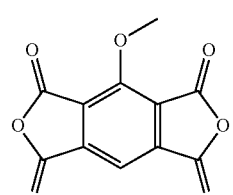

-continued
Compound 5
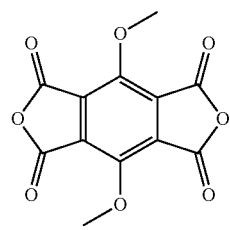
Compound 6
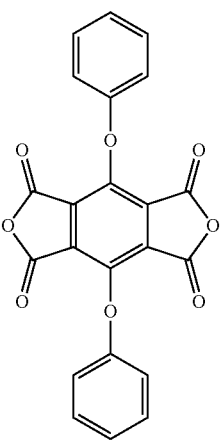
Compound 7
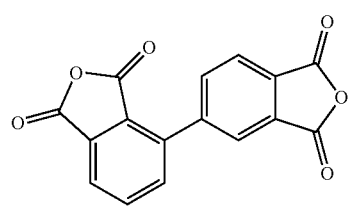
Compound 8
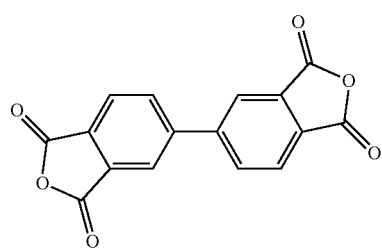
Compound 9
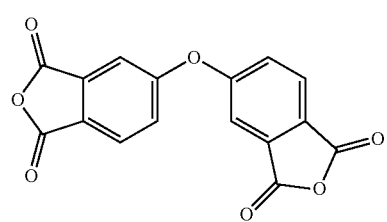
Compound 10
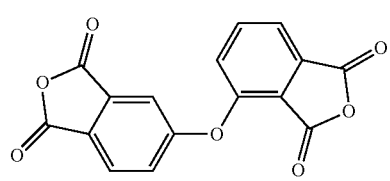
Compound 11
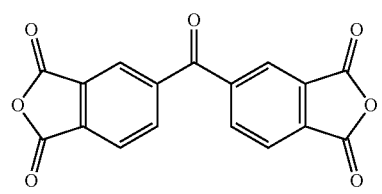
Compound 12
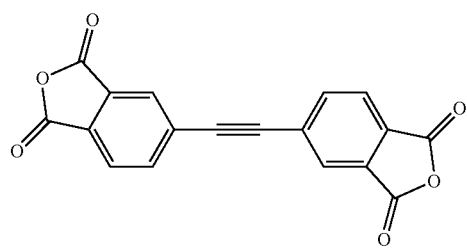
Compound 13
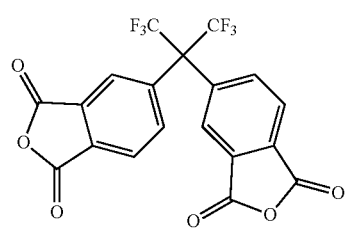
Compound 14
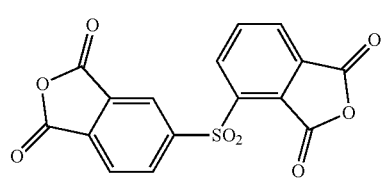
Compound 15
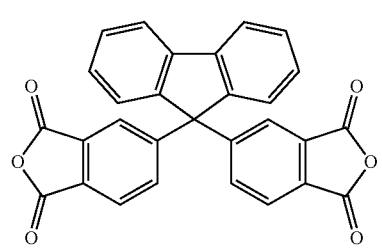
Compound 16
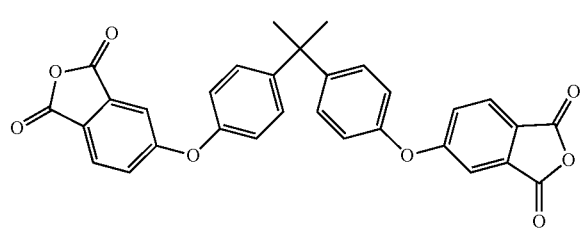

-continued
Compound 17
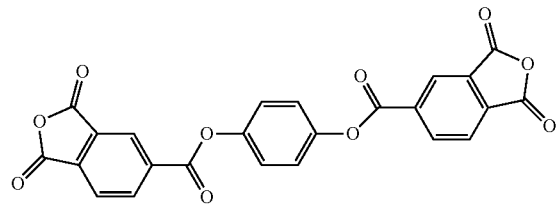
Compound 18
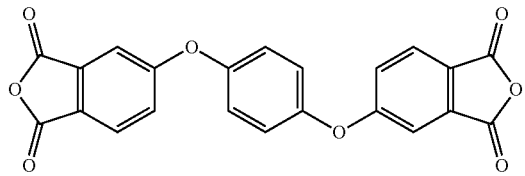
Compound 19
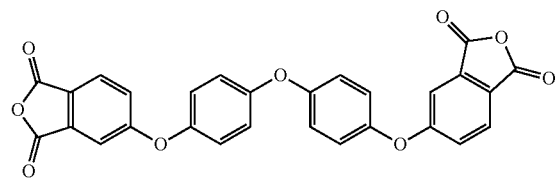
Compound 20
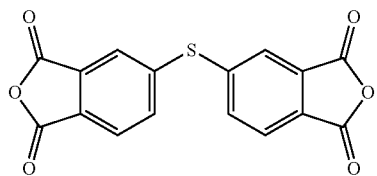
Compound 21
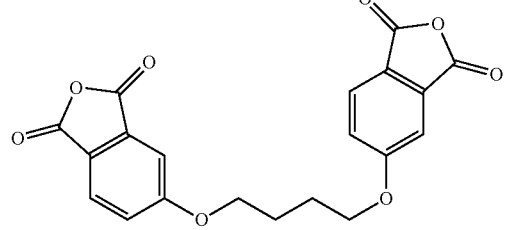
Compound 22
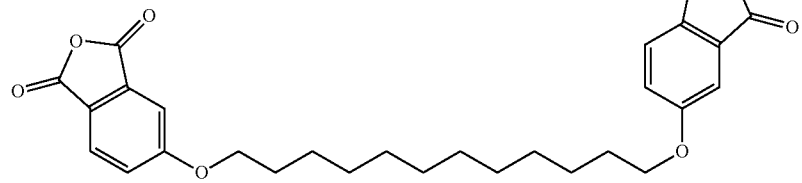
Compound 23
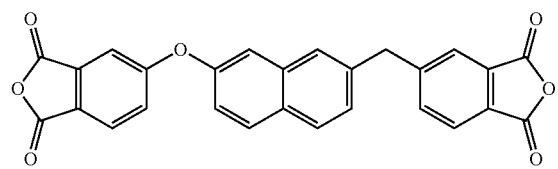
Compound 24
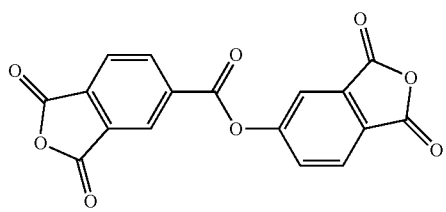
Compound 25
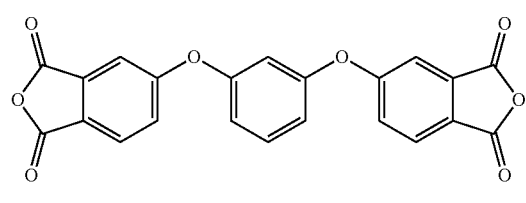
Compound 26
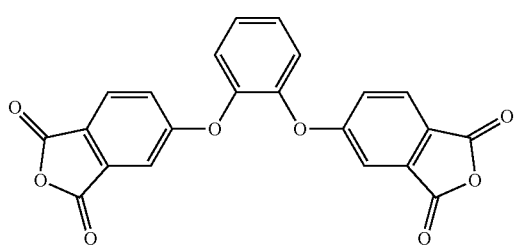

-continued
Compound 27
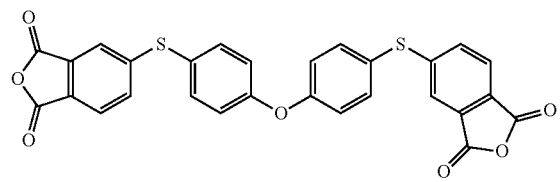
Compound 28
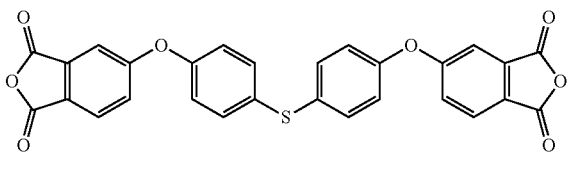
Compound 29
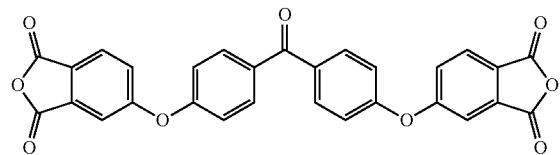
Compound 30
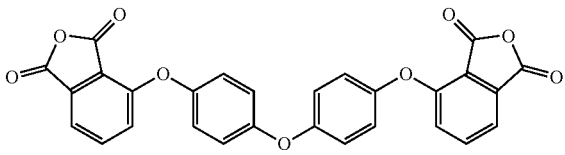
Compound 31
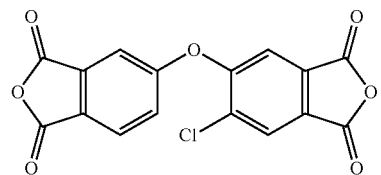
Compound 32
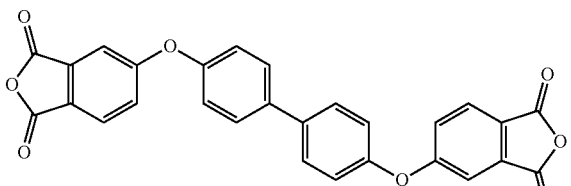
Compound 33
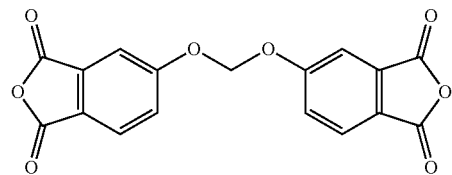
Compound 34
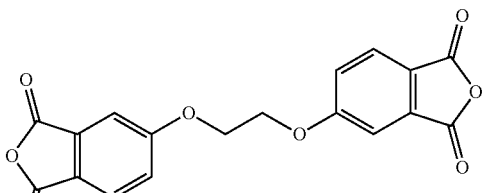
Compound 35
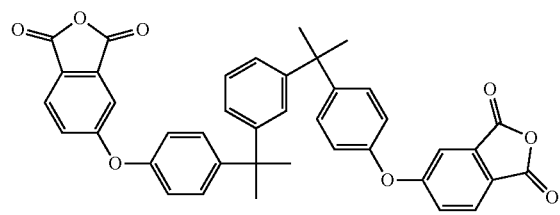
Compound 36
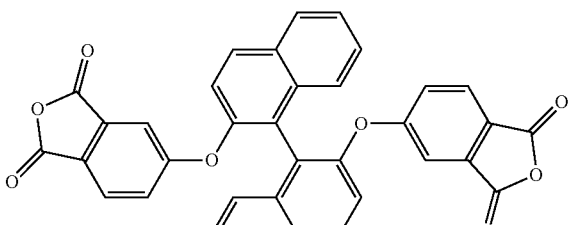
Compound 37
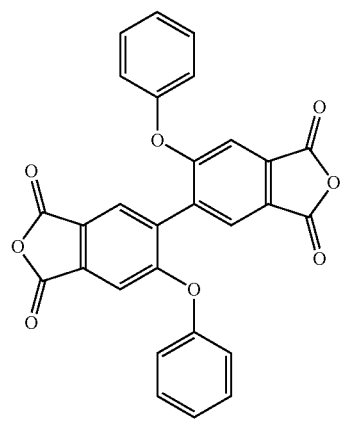
Compound 38
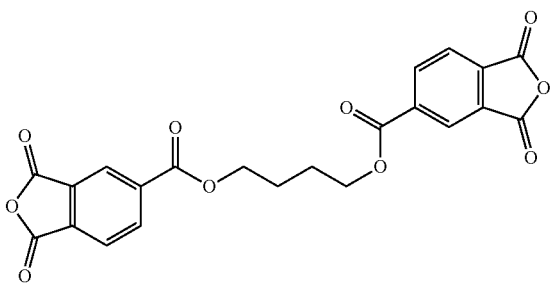

-continued
Compound 39
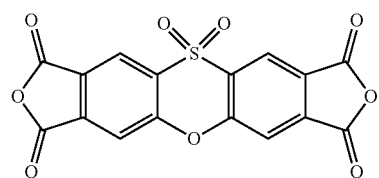
Compound 40
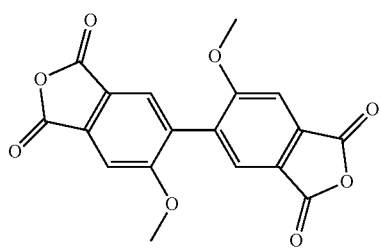
Compound 41
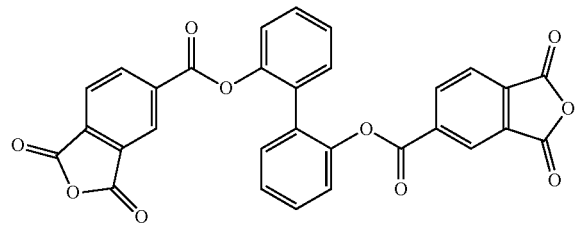
Compound 42
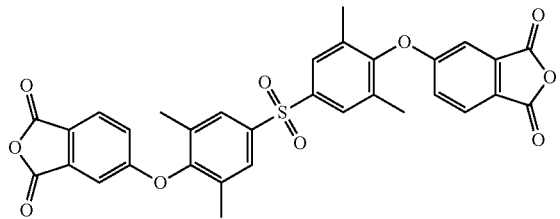
Compound 43
Compound 44
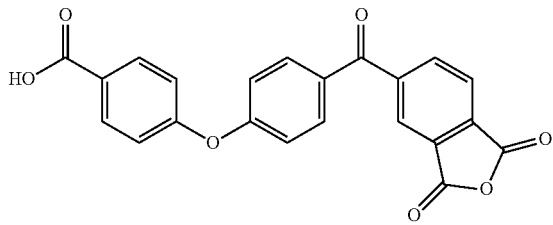
Compound 45
Compound 46
Compound 47
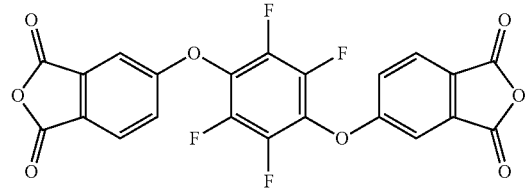
Compound 48
Compound 49
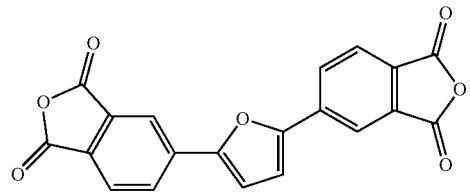
Compound 50
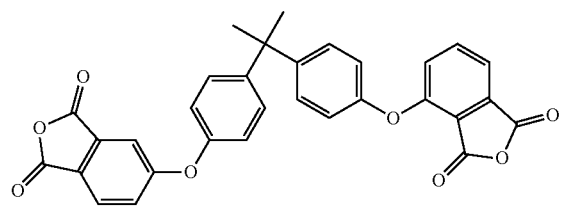
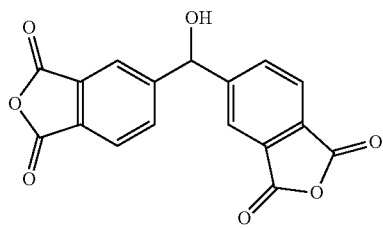

The tertiary amine can be the same as those represented by Z in Chemical Formula (I).

Active Energy Ray Curing Composition

The active energy ray curing composition contains the active energy ray curing composition having the structure represented by Chemical Formula (1) or Chemical Formula (2) and other optional components selected to suit to a desired property of a polymerized compound. Examples of the other components include, but are not limited to, a polymerizable monomer, a polymerization initiator having a structure other than the structure represented by Chemical Formula (1) or Chemical Formula (2), an organic solvent, water, a surfactant, and resin. The active energy ray curing composition may furthermore optionally contain a coloring material when the active energy ray curing composition is used as active energy ray curing ink.

"The active energy ray curing composition" in the present disclosure means a liquid composition that forms cured matter at exposure to active energy radiation such as light.

Active Energy Ray Polymerization Initiator Having Structure Represented by Chemical Formula (1) or Chemical Formula (2)

The proportion of the active energy ray polymerization initiator having the structure represented by Chemical Formula (1) or Chemical Formula (2) to the entire active energy ray curing composition is determined to suit to an active energy ray curing composition. It is preferably from 1.0 to 30.0 percent by mass and more preferably from 5.0 to 15.0 percent by mass.

Polymerizable Monomer

Example of the polymerizable monomer include, but are not limited to, (meth) acrylate, (meth)acrylamide, and vinyl ether.

Specific examples include, but are not limited to, ethylene glycol di(meth)acrylate, hydroxy pivalic acid neopentyl glycol di(meth)acrylate, γ-butylolactone acrylate, isobornyl (meth)acrylate, formalized trimethylol propanemono(meth)acrylate, polytetramethylene glycol di(meth)acrylate, trimethylol propane (meth)acrylic acid benzoic acid ester, triethylene glycol di(meth)acrylate, tetraethylene glycol di(meth)acrylate, polyethylene glycol diacrylate [($CH_2$=CH—CO—($OC_2H_4$)$_n$—OCOCH=$CH_2$ (n≈4)], polyethylene glycol diacrylate [($CH_2$=CH—CO—($OC_2H_4$)$_n$—OCOCH=$CH_2$ (n≈9)], polyethylene glycol diacrylate [($CH_2$=CH—CO—($OC_2H_4$)$_n$—OCOCH=$CH_2$ (n≈14)], polyethylene glycol diacrylate [($CH_2$=CH—CO—($OC_2H_4$)$_n$—OCOCH=$CH_2$ (n≈23)], dipropylene glycol di(meth)acrylate, tripropylene glycol di(meth)acrylate, polypropylene glycol dimethacrylate [($CH_2$=C($CH_3$)—CO—($OC_3H_6$)$_n$—OCOC($CH_3$)=$CH_2$ (n≈7)], 1,3-butane diol di(meth)acrylate, 1,4-butane diol di(meth)acrylate, 1,6-hexane diol di(meth)acrylate, 1,9-nonane diol di(meth)acrylate, neopentyl glycol diacrylate, tricyclodecane dimethanol diacrylate, propylene oxide-modified bisphenol A di(meth)acrylate, 1,6-hexane dioldi(meth)acrylate, polyethylene glycol di(meth)acrylate, dipenta erythritol hexa(meth)acrylate, methacryloyl morphorine, propylene oxide-modified tetramethylol methane tetramethacrylate, dipentaerythritol hydroxypenta(meth)acrylate, caprolactone-modified dipentaerythritol hydroxy penta(meth)acrylate, ditrimethylol propane tetra(meth)acrylate, pentaerythritol tetra(meth)acrylate, trimethylol propane triacrylate, ethylene oxide-modified trimethylol propane tri(meth)acrylate, propylene oxide-modified trimethylol propane tri(meth)acrylate, caprolactone-modified trimethylol propane tri(meth)acrylate, pentaetythritol tri(meth)acrylate, tris(2-hydroxyethyl) isocyanulate tri(meth)acrylate, neopentyl glycol diacrylate, ethoxylated neopentyl glycol di(meth)acrylate, propylene oxide-modified neopentyl glycol di(meth)acrylate, propylene oxide-modified glyceryl tri(meth)acrylate, polyester di(meth)acrylate, polyester tri(meth)acrylate, polyester tetra (meth)acrylate, polyester penta(meth)acrylate, polyester poly(meth)acrylate, polyurethane di(meth)acrylate, polyurethanetri(meth)acrylate, polyurethane tetra(meth)acrylate, polyurethane penta(meth)acrylate, polyurethane poly(meth) acrylate, 2-hydroxypropyl(meth)acrylamide, N-vinylcaprolactam. N-vinyl pyrrolidone, N-vinyl formamide, cyclohexane dimethanol monovinylether, cyclohexane dimethanol divinylether, hydroxyethyl vinylether, diethylene glycol monovinylether, diethylene glycol divinylether, dicyclopenta dienevinylether, tricyclodecane vinylether, benzylvinylether, and ethyloxethane methylvinylether.

The proportion of the polymerizable monomer to the entire active energy ray curing composition is determined to suit to a particular application. It is preferably from 70.0 to 99.0 percent by mass and more preferably from 85.0 to 95.0 percent by mass.

Polymerization Initiator Having Structure Other than Chemical Formula (1)

The active energy ray curing composition may include a polymerization initiator having a structure other than the structure represented by Chemical Formula (1) or Chemical Formula (2). The polymerization initiator is not particularly limited as long as it produces active species such as a radical or a cation upon an application of energy of active energy radiation, which initiates polymerization of a polymerizable compound (monomer or oligomer). The polymerization initiator can be a known radical polymerization initiator, a cation polymerization initiator, abase producing agent, or a combination thereof. Of these initiators, radical polymerization initiators are preferable.

Specific examples of the radical polymerization initiators include, but are not limited to, aromatic ketones, acylphosphineoxide compounds, aromatic oniumchlorides, organic peroxides, thio compounds such as thioxanthone compounds, compounds including thiophenyl groups, hexaaryl-biimidazole compounds, ketoxime-esterified compounds, borate compounds, azinium compounds, metallocene compounds, active ester compounds, compounds having a carbon halogen bond, and alkylamine compounds.

The proportion of the active energy ray polymerization initiator having a structure other than the structure represented by Chemical Formula (1) or Chemical Formula (2) to the entire active energy ray curing composition is determined to suit to a particular application of an active energy ray curing composition. It is preferably from 0 to 5.0 percent by mass.

In addition, a polymerization accelerator or sensitizer can be optionally used together with the polymerization initiator. The polymerization accelerator is not particularly limited. Examples include, but are not limited to, amine compounds such as trimethylamine, methyldimethanolamine, triethanolamine, p-diethylaminoacetophenone, p-dimethylaminoethylbenzoate, p-dimethyl aminobenzoate-2-ethylhexyl, N,N-dimthylbenzylamine, and 4,4'-bis(diethylamino)benzophenone. The proportion of a polymerization accelerator is suitably determined to suit to the type and proportion of a polymerization initiator used in combination.

Organic Solvent

The active energy ray curing composition may include an organic solvent. The organic solvent can be used in combination with a hydrophilic organic solvent because the active energy ray polymerization initiator represented by Chemical Formula (1) and Chemical Formula (2) is water-soluble.

Specific examples of the water-soluble organic solvent include, but are not limited to: polyhydric alcohols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

The proportion of the organic solvent to an active energy ray curing composition is determined to suit to a particular application of the active energy ray curing composition. It is preferably from 10.0 to 60.0 percent by mass.

Water

The active energy ray curing composition may include water because the active energy ray polymerization initiator represented by Chemical Formula (1) and Chemical Formula (2) is water-soluble. The proportion of water in an active energy ray polymerization initiator is determined to suit to a particular application of the active energy ray curing composition. It is preferably from 10.0 to 60.0 percent by mass. The aqueous active energy ray curing composition in the present disclosure has a proportion of water of 15.0 percent by mass or more in the active energy ray curing composition. The proportion of water in an aqueous active energy ray curing composition is preferably 20.0 percent by mass or more and more preferably 25.0 percent by mass or more. The proportion of the entire of water and an water-soluble organic solvent to an aqueous active energy ray curing composition is preferably 30.0 percent by mass or more, more preferably 40.0 percent by mass or more, and furthermore preferably 50.0 percent by mass.

Surfactant

The active energy ray curing composition may contain a surfactant. The surfactant is not particularly limited.

Specific examples include, but are not limited to, fluorine-containing surfactants, silicone-based surfactants, and non-ionic surfactants.

The silicone-based surfactant has no specific limit and can be suitably selected to suit to a particular application.

Of these, surfactants not decomposable in a high pH environment are preferable. Examples include, but are not limited to, side chain modified polydimethyl siloxane, both terminal-modified polydimethyl siloxane, one-terminal-modified polydimethyl siloxane, and side-chain-both-terminal-modified polydimethyl siloxane. Silicone-based surfactants having a polyoxyethylene group or a polyoxyethylene polyoxypropylene group as a modification group are particularly preferable because such an aqueous surfactant demonstrates good properties. The silicone-based surfactant can be a polyether-modified silicone-based surfactant. One of the surfactant is a compound in which a polyalkylene oxide structure is introduced into the side chain of the Si site of dimethyl silooxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not readily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carbonic acid compounds include, but are not limited to, perfluoroalkyl carbonic acid and salts of perfluoroalkyl carbonic acid.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

The proportion of a surfactant in an active energy ray curing composition is determined to suit to a particular application of the active energy ray curing composition. It is preferably from 1.0 to 5.0 percent by mass.

Resin

The active energy ray curable composition may contain a resin. The resin may contain a resin emulsion in which resin particles are dispersed in water as a dispersion medium.

The type of the resin has no particular limit and can be suitably selected to suit to a particular application. Examples include, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins. The resin particle can be used alone or two or more type of the resin particles can be used in combination.

The proportion of resin in an active energy ray polymerization initiator is determined to suit to a particular application of the active energy ray curing composition. It is preferably from 10.0 to 90.0 percent by mass.

Coloring Material

The active energy ray curing composition may furthermore optionally contain a coloring material when the active energy ray curing composition is used as active energy ray curing ink. The coloring material contained in an active energy ray curing composition absorbs active energy radiation depending on the type and amount of the coloring material. In accordance with the absorption, the amount of an active energy ray polymerization initiator is preferably adjusted.

The coloring material has no particular limitation and includes materials such as a pigment and a dye. The pigment includes an inorganic pigment or organic pigment. These can be used alone or in combination. A mixed crystal can also be used as the coloring material.

Examples of the pigments include, but are not limited to, black pigments, yellow pigments, magenta pigments, cyan pigments, white pigments, green pigments, orange pigments, and gloss or metallic pigments of gold, silver, and others.

Carbon black manufactured by known methods such as contact methods, furnace methods, and thermal methods can be used as the inorganic pigment in addition to titanium oxide, iron oxide, calcium carbonate, barium sulfate, aluminum hydroxide, barium yellow, cadmium red, and chrome yellow.

Specific examples of organic pigments include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (e.g., basic dye type chelates and acid dye type chelates), nitro pigments, nitroso pigments, and aniline black. Of these pigments, pigments having good affinity with solvents are preferable. Hollow resin particles and hollow inorganic particles can also be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to: C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63, C.I. Pigment Green 1, 4, 7, 8, 10, 17, 18, and 36.

The dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142. C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material to the entire active energy ray curing composition is determined to suit to a particular application. It is preferably from 1.0 to 15.0 percent by mass and more preferably from 1.0 to 10.0 percent by mass.

Methods of obtaining an active energy ray curing composition by dispersing a pigment include, but are not limited to, preparing a self-dispersible pigment by introducing a hydrophilic functional group into a pigment, coating the surface of a pigment with a resin followed by dispersion, and using a dispersant for dispersing a pigment.

One way of preparing a self-dispersible pigment by introducing a hydrophilic functional group into a pigment is to add a functional group such as a sulfone group and carboxyl group to a pigment (e.g., carbon) to disperse the pigment in water.

One way of dispersing a pigment by coating the surface of the pigment with resin is to encapsulate pigment particles in microcapsules for dispersion in water. This microcapsulated pigment is also referred to as a resin-coated pigment. In this case, all the pigments added are not necessarily entirely coated with a resin. The pigments may contain never or partially coated with a resin.

One way of using a dispersant for dispersing a pigment is to use a known dispersant of a small or large molecular weight, typically a surfactant. As the dispersant, an anionic surfactant, a cationic surfactant, a nonionic surfactant, an amphoteric surfactant, or others can be selected depending on a pigment. Also, a nonionic surfactant, RT-100, manufactured by TAKEMOTO OIL & FAT CO., LTD, and a formalin condensate of naphthalene sodium sulfonate are suitable as the dispersant. Those can be used alone or in combination.

Other Components

The active energy ray curing composition may further optionally contain additives such as a defoaming agent, a preservative and fungicide, a corrosion inhibitor, and a pH regulator.

Defoaming Agent

The defoaming agent has no particular limit. Examples include, but are not limited to silicon-based defoaming agents, polyether-based defoaming agents, and aliphatic acid ester-based defoaming agents. These can be used alone or in combination. Of these, silicone-based defoaming agents are preferable to achieve the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limit. Specific examples include, but are not limited to, acid sulfites and sodium thiosulfates.

pH Regulator

The pH regulator has no particular limit as long as it can control pH to 7 or greater. It includes, but are not limited to, amines such as diethanol amine and triethanol amine.

Properties of Active Energy Ray Curing Composition

Properties of the active energy ray curing composition are not particularly limited and can be suitably selected to suit to a particular application. For example, viscosity, surface tension, and pH are preferably in the following ranges.

The viscosity of ink is preferably from 5 to 30 mPa s and more preferably from 5 to 25 mPa s at 25 degrees C. to enhance the print density and text quality and achieve good dischargeability. Viscosity can be measured by equipment such as a rotatory viscometer, RE-80L, manufactured by TOKI SANGYO CO., LTD. The measuring conditions are as follows:

Standard cone rotor (1° 34'×R24)
Sample liquid amount: 1.2 mL
Rate of rotation: 50 rotations per minute (rpm)
25 degrees C.
Measuring time: three minutes.

The surface tension of the active energy ray curing composition is preferably 35 mN/m or less and more preferably 32 mN/m at 25 degrees C. for the active energy ray curing composition to level on a substrate and dry quickly.

pH of the active energy ray curing composition is preferably from 7 to 12 and more preferably from 8 to 11 to prevent corrosion of metal materials in contact with liquid.

Method of Manufacturing Active Energy Ray Curing Composition

The active energy ray curing composition of the present disclosure is prepared by using the components mentioned above. The preparation devices and conditions are not particularly limited.

One way of manufacturing the curing composition is to load a polymerizable monomer, a pigment, a dispersant, and other substances into a dispersing machine such as a ball mill, a kitty mill, a disk mill, a pin mill, and a DYNO-MILL to prepare a pigment liquid dispersion followed by mixing with a polymerizable monomer, an active energy ray curing composition, a polymerization inhibitor, and a surfactant.

Field of Application

The application field of the curing composition of the present disclosure is not particularly limited and can be suitably selected to suit to a particular application. The composition can be used to prepare a resin for molding, a paint, adhesive, insulant, release agent, coating material, sealing material, resist, and optical material.

Figure 6:
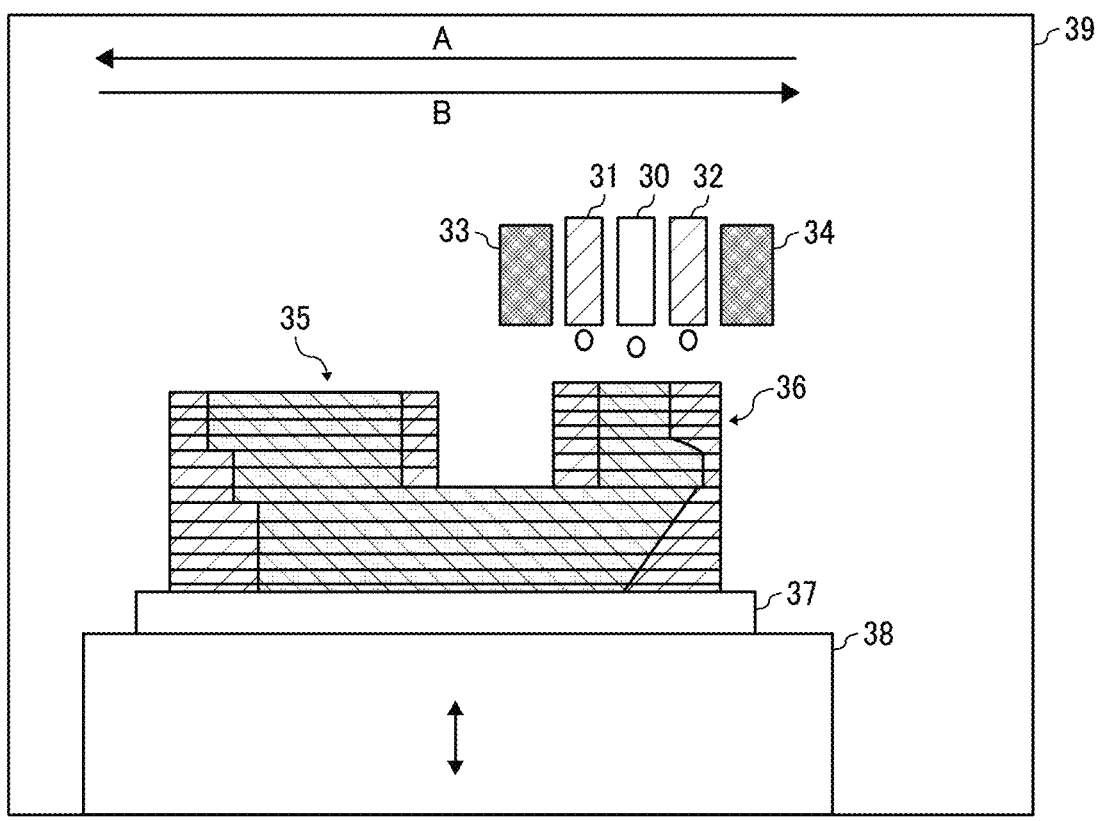
FIG. 6 is a schematic diagram illustrating another example of the image forming device according to an embodiment of the present disclosure.
Figure 7A:
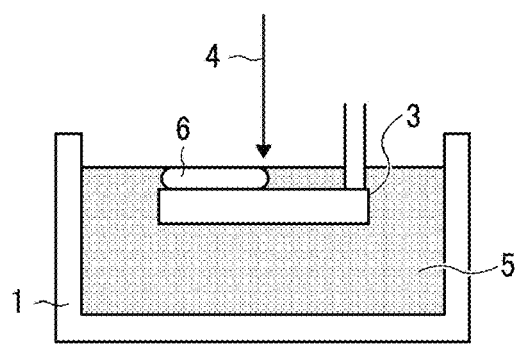
FIGS. 7A, 7B, 7C, and 7D are schematic diagrams illustrating yet another example of the image forming device according to an embodiment of the present disclosure.
Figure 7B:
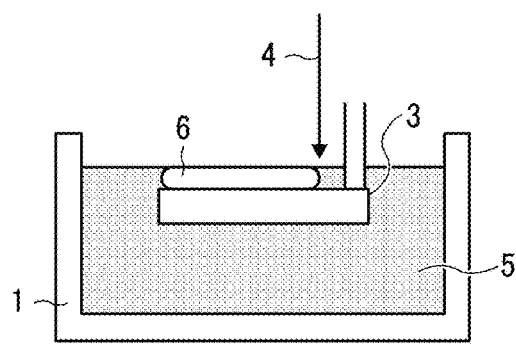
Figure 7C:
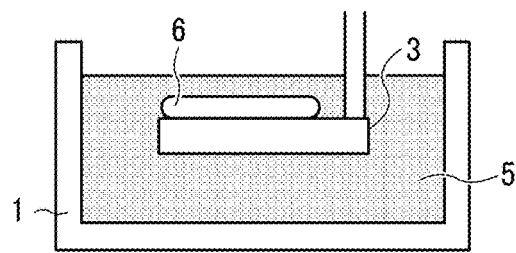
Figure 7D:
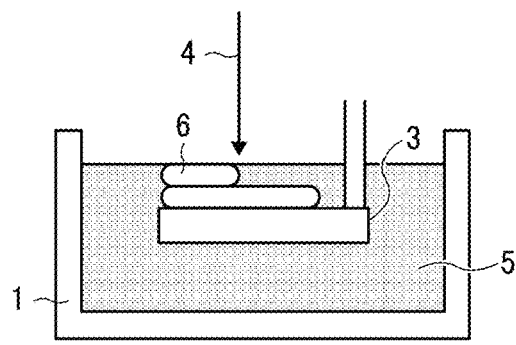

The active energy ray curing composition is used as an active energy ray curing ink for forming two-dimensional texts, images, and designed coating film on various substrates and in addition as a solid object forming material for forming a three-dimensional object. The solid object forming material can be also used as a binder for powder particles for use in a powder additive manufacturing involving repeating laminating and curing powder layers for forming a solid object. This material is also used as a solid forming material, i.e., a modeling material or a supporting material for use in stereolithography as illustrated in FIGS. 6 and 7. FIG. 6 is a diagram illustrating a method of discharging a active energy ray curing composition to a particular area followed by curing upon irradiation of active energy radiation to form a layer and sequentially laminating the layers. The detail is described later. FIGS. 7A to 7D are diagrams illustrating a method of irradiating a pool (accommodating unit) 1 of an active energy ray curing composition 5 with active energy ray 4 to form a cured layer 6 having a particular form on a movable stage 3 and sequentially laminating the cured layer 6, thereby forming a solid freeform fabrication object.

Solid freeform fabrication objects is fabricated with an active energy ray curing composition using a known device without any particular limitation.

Such a device is configured to include an accommodating unit for an active energy ray curing composition, a supplying device, a discharging device, and an active energy ray irradiator.

The solid freeform fabrication fabricated using an active energy ray curing composition includes a molded product created by processing cured matter obtained by curing an active energy ray curing composition. The molded product is obtained by subjecting cured matter or structure having a sheet form or film form to molding process such as hot drawing and punching. The molded product is preferably used for items to be molded after surface decoration. They are gauges or operation panels of products such as vehicles, office machines, electric and electronic machines, and cameras.

A substrate to which an active energy ray curing composition is applied is not particularly limited and can be suitably selected to suit to a particular application. It includes paper, fiber, threads, fabrics, leather, metal, plastic, glass, wood, ceramics, or composite materials. Of these, plastic substrates are preferred in terms of processability.

Container

The container contains an active energy ray curing composition. It is suitable for the applications mentioned above. The container containing an active energy ray curable composition as an ink can be used as an ink cartridge or an ink bottle. This obviates the need for direct contact with ink during operations such as ink conveying and ink replacement, resulting in no contamination of fingers and clothes. In addition, foreign matter such as dust does not enter the active energy ray curable ink. The container can be of any size, any form, and any material. For example, the container can be designed to suit to a particular application. The container is preferably made of a light blocking material or covered with materials such as a light blocking sheet.

Image Forming Method and Image Forming Device

The image forming method includes discharging an active energy ray curing composition and exposing the active energy ray curing composition that has been discharged to active energy radiation. The active energy ray preferably has a peak in a range of wavelength of from 350 to 400 nm as described above.

The image forming device includes a container containing an active energy ray curing composition, a discharging device for discharging the active energy ray curing composition in the container, and an irradiator for exposing the active energy ray curing composition to active energy radiation. The active energy ray preferably has a peak in a range of wavelength of from 350 to 400 nm as described above.

The image forming method and the image forming device are described below about an embodiment where the active energy ray curing composition is an active energy ray curing ink.

Figure 5:
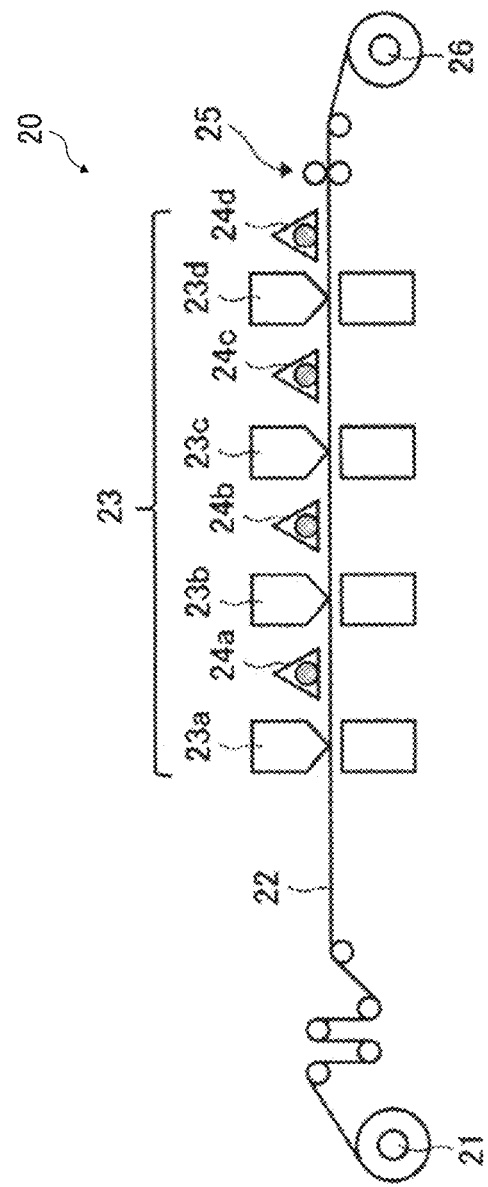
FIG. 5 is a schematic diagram illustrating an example of an image forming device according to an embodiment of the present disclosure according to an embodiment of the present disclosure.

FIG. 5 is a diagram illustrating an image forming device 20 including an inkjet discharging device. Color printing units 23a, 23b, 23c, and 23d having ink cartridges and discharging heads for yellow, magenta, cyan, and black active energy curable inks respectively discharge the inks onto a recording medium 22 fed from a supplying roll 21. Thereafter, light sources (irradiators) 24a, 24b, 24c, and 24d emit active energy rays to the inks to allow polymerization reaction, thereby curing to form a color image. Thereafter, the recording medium 22 is conveyed to a processing unit 25 and a printed matter reeling roll 26. Each of the printing units 23a, 23b, 23c, and 23d may include a heating assembly for liquidizing the ink at the ink discharging unit. Moreover, a mechanism may be optionally disposed which cools down the recording medium to an ambient temperature in a contact or non-contact manner. One of the inkjet recording methods is a serial method including discharging an ink onto a recording medium that incessantly moves in accordance with the width of a discharging head while moving the head. Another way is a line method including discharging an ink onto a recording medium that continuously moves from a discharging head fixed at a particular position. The discharging device in this embodiment is inkjetting but is not limited thereto. It can employ a thermal method, electrostatic method, and others.

The recording medium 22 is not particularly limited.

Specific examples include, but are not limited to, paper, film, ceramics, glass, metal, or complex materials thereof.

The recording medium 22 may take a sheet form. The image forming device may have a simplex printing configuration capable of printing on one side of a substrate or a duplex printing configuration capable of printing on both sides thereof. The substrate is not limited to a common recording medium. The following is also suitable: corrugated cardboard, building materials such as wall paper and floor material, cloth for apparel such as T-shirts, textile, and leather.

In addition, after an image is printed with multiple colors with no or faint active energy radiation from the light sources 24a. 24b, and 24c, the light source 24d exposes the image to active energy radiation. This configuration saves energy and cost.

The print matter as a type of cured matter printed with the ink includes items having printed text or images on a plain surface of a medium including conventional paper and resin film, items having printed text or images on a rough surface, and items having printed text or images on a surface made of various materials such as metal or ceramic. The print matter can make a solid feeling image formed of two-dimensional image portions and three-dimensional image portions or a solid object by laminating two dimensional images.

FIG. 6 is a schematic diagram illustrating an example of another image forming device (device for fabricating a three-dimensional image). An image forming device 39 illustrated in FIG. 6 stacks layers by: discharging a first active energy ray curing ink from a discharging head unit 30 for fabrication and a second active energy ray curing ink composed of different ingredients from those of the first active energy ray curing ink from discharging head units 31 and 32 for a support by using a head unit having inkjet heads disposed movable in the directions indicated by the arrows A and B; curing each composition with ultraviolet irradiators 33 and 34 disposed adjacent to the discharging head units 31 and 32 respectively; and repeating the discharging and the curing.

For example, the discharging head units 31 and 32 for a support discharge the second active energy curing ink onto a substrate 37 for fabrication. The second active energy curing ink is solidified at exposure to active energy radiation, thereby forming a first support layer having a hollow space (pool) for fabrication. The discharging head unit 30 for fabrication discharges the first active energy curing ink onto the hollow space followed by exposure to active energy radiation for solidification, which forms a first fabrication layer. This step is repeated multiple times in accordance with the required number of lamination while moving the stage 38 up and down in the vertical direction to laminate the support layer and the fabrication layer. A solid freeform fabrication object 35 is thus created.

Thereafter, a laminated support 36 is removed. Although there is only one discharging head unit 30 for fabrication in FIG. 6, the device may have two or more discharging head units 30.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Preparation of Precursor of Active Energy Ray Polymerization Initiator

Synthesized Example 1

A total of 25 mL of methylethyl ketone (MEK) was placed in a 100 mL flask. Next, 2.29 g (10.0 mmol) of 2-hydroxy-9H-thioxanthone-9-one, manufactured by Chemieliva Pharmaceutical Co., Ltd., 1.88 g (15.0 mmol) of 2-bromoethanol, manufactured by TOKYO CHEMICAL INDUSTRY CO., LTD., and 2.08 g (15.0 mmol) of potassium carbonate were added to the flask followed by heating the resulting mixture for 10 hours while being held at reflux. The liquid mixture was cooled down to room temperature, diluted with 50 mL of ethyl acetate, and filtered with filter paper. The filtrate was purged of the solvent. The residual was purified by silica gel column chromatography using toluene/ethyl acetate at 10:0 to 6:4 (v:v) as eluent. A total of 2.34 g of 2-(2-hydroxyethoxy)-9H-thioxanthene-9-one was thus obtained.

A total of 20 mL of dichloromethane (MDC) (superdehydrated) and 0.328 g (1.5 mmol) of pyromellitic acid anhydride were placed in a 50 mL flask and dissolved in nitrogen atmosphere. Next, 0.820 g (3.0 mmol) of 2-(2-hydroxyethoxy)-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual obtained was heated and dissolved in toluene/isopropanol at 1:3 (v:v), followed by recrystallization, resulting in production of 0.88 g of the precursor (TX1) of active energy ray polymerization initiator represented by the following Chemical Formula.

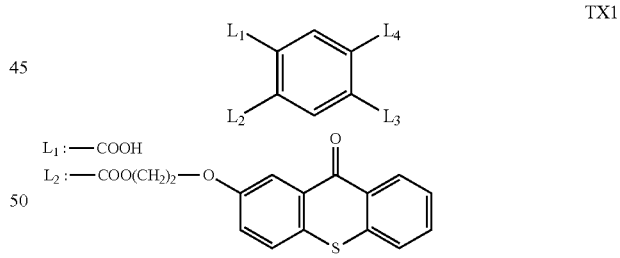

TX1

One of $L_3$ and $L_4$ represents the same group as $L_1$ and the other of $L_3$ and $L_4$ represents the same group as $L_2$.

Synthesized Example 2

A total of 25 mL of MEK was placed in a 100 mL flask. Next, 2.29 g (10.0 mmol) of 2-hydroxy-9H-thioxanthone-9-one, manufactured by Chemieliva Pharmaceutical Co., Ltd., 2.72 g (15.0 mmol) of 6-bromohexanol, manufactured by TOKYO CHEMICAL INDUSTRY CO., LTD., and 2.07 g (15.0 mmol) of potassium carbonate were added to the flask followed by heating the resulting mixture for 10 hours while being held at reflux. The liquid mixture was cooled down to room temperature, diluted with 50 mL of ethyl acetate, and filtered with filter paper. The filtrate was purged of the solvent. The residual was purified by silica gel column chromatograhpy using toluene/ethyl acetate at 10:0 to 6:4 (v:v) as eluent. A total of 2.95 g of 2-(6-hydroxyhexanoxy)-9H-thioxanthene-9-one was thus obtained.

A total of 20 mL of MDC (superdehydrated) and 0.328 g (1.5 mmol) of pyromellitic acid anhydride were placed in a 50 mL flask and dissolved in nitrogen atmosphere. Next, 0.99 g (3.0 mmol) of 2-(6-hydroxyhexanoxy)-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 1.08 g of the precursor (TX2) of active energy ray polymerization initiator represented by the following Chemical Formula.

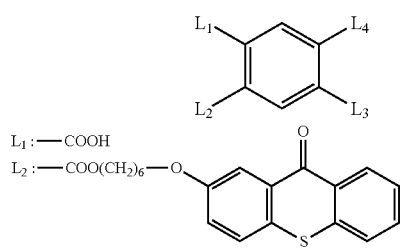

TX2

$L_1$:—COOH
$L_2$:—COO(CH$_2$)$_6$—O

One of $L_3$ and $L_4$ represents the same group as $L_1$ and the other of $L_3$ and $L_4$ represents the same group as $L_2$.

Synthesized Example 3

A total of 25 mL of MEK was placed in a 100 mL flask. Next, 2.29 g (10.0 mmol) of 2-hydroxy-9H-thioxanthone-9-one, manufactured by Chemieliva Pharmaceutical Co., Ltd., 3.99 g (15.0 mmol) of 12-bromododecanol, manufactured by TOKYO CHEMICAL INDUSTRY CO., LTD., and 2.08 g (15.0 mmol) of potassium carbonate were added to the flask followed by heating the resulting mixture for 10 hours while being held at reflux. The liquid mixture was cooled down to room temperature, diluted with 50 mL of ethyl acetate, and filtered with filter paper. The filtrate was purged of the solvent. The residual was purified by silica gel column chromatograhpy using toluene/ethyl acetate at 10:0 to 6:4 (v:v) as eluent. A total of 3.44 g of 2-(12-hydroxydodecanoxy)-9H-thioxanthene-9-one was thus obtained.

A total of 20 mL of MDC (superdehydrated) and 0.328 g (1.5 mmol) of pyromellitic acid anhydride were placed in a 50 mL flask and dissolved in nitrogen atmosphere. Next, 1.24 g (3.0 mmol) of 2-(12-hydroxydodecanoxy)-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 1.19 g of the precursor (TX3) of active energy ray polymerization initiator represented by the following Chemical Formula.

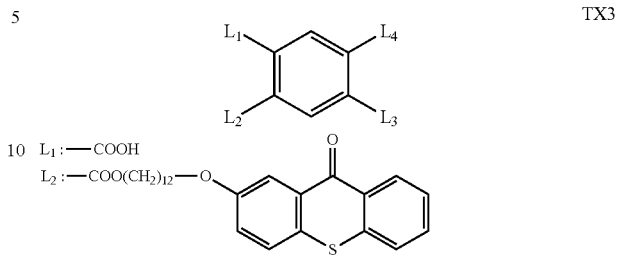

TX3

$L_1$:—COOH
$L_2$:—COO(CH$_2$)$_{12}$—O

One of $L_3$ and $L_4$ represents the same group as $L_1$; and the other of $L_3$ and $L_4$ represents the same group as $L_2$.

Synthesized Example 4

A total of 25 mL of MEK was placed in a 100 mL flask. Next, 2.29 g (10.0 mmol) of 2-hydroxy-9H-thioxanthone-9-one, manufactured by Chemieliva Pharmaceutical Co., Ltd., 2.54 g (15.0 mmol) of 2-(2-bromoethoxy)etanol, manufactured by AstaTech, and 2.08 g (15.0 mmol) of potassium carbonate were added to the flask followed by heating the resulting mixture for 10 hours while being held at reflux. The liquid mixture was cooled down to room temperature and filtered with filter paper. Thereafter, 30 mL of MDC and 40 mL of deionized water were added to the filtrate followed by stirring for 10 minutes. The organic phase was isolated, followed by distilling away the solvent. The residual was purified by silica gel column chromatograhpy using MDC/methanol at 100:0 to 95:5 (v:v) as eluent. A total of 2.44 g of 2-[(2-(2-hydroxy) ethoxy]-9H-thioxanthene-9-one was thus obtained.

A total of 20 mL of MDC (superdehydrated) and 0.328 g (1.5 mmol) of pyromellitic acid anhydride were placed in a 50 mL flask and dissolved in nitrogen atmosphere. Next, 0.95 g (3.0 mmol) of 2-[2-(2-hydroxy) ethoxy]-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:2 (v:v), followed by recrystallization, resulting in production of 1.02 g of the precursor (TX4) of active energy ray polymerization initiator represented by the following Chemical Formula.

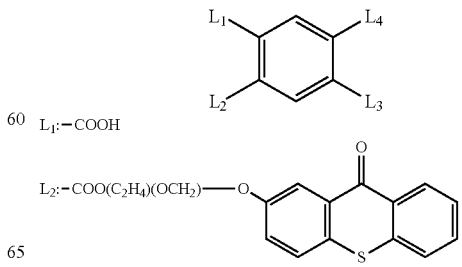

TX4

$L_1$:—COOH
$L_2$:—COO(C$_2$H$_4$)(OCH$_2$)—O

One of $L_3$ and $L_4$ represents the same group as $L$; and the other of $L_3$ and $L_4$ represents the same group as $L_2$.

Synthesis Example 5

A total of 25 mL of MEK was placed in a 100 mL flask. Next, 2.29 g (10.0 mmol) of 2-hydroxy-9H-thioxanthone-9-one, manufactured by Chemieliva Pharmaceutical Co., Ltd., 5.20 g (15.0 mmol) of 17-bromo-3,6,9,12,15-pentaoxa-heptadecane-1-ol, manufactured by AstaTech, and 2.08 g (15.0 mmol) of potassium carbonate were added to the flask followed by heating the resulting mixture for 10 hours while being held at reflux. The liquid mixture was cooled down to room temperature and filtered with filter paper. Thereafter, 30 mL of MDC and 40 mL of deionized water were added to the filtrate followed by stirring for 10 minutes. The organic phase was isolated, followed by distilling away the solvent. The residual was purified by silica gel column chromatograhpy using MDC/methanol at 100:0 to 95:5 (v:v) as eluent. A total of 3.88 g of 2-[(2-(2-(2-(2-(2-(2hydroxy-ethoxy) ethoxy) ethoxy) ethoxy) ethoxy) ethoxy]-9H-thio-xanthene-9-one was thus obtained.

A total of 20 mL of MDC (superdehydrated) and 0.328 g (1.5 mmol) of pyromellitic acid anhydride were placed in a 50 mL flask and dissolved in nitrogen atmosphere. Next, 1.48 g (3.0 mmol) of 2-[(2-(2-(2-(2-(2-(2hydroxyethoxy) ethoxy) ethoxy) ethoxy) ethoxy]-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:2 (v:v), followed by recrystallization, resulting in production of 1.44 g of the precursor (TX5) of active energy ray polymerization initiator represented by the following Chemical Formula.

TX5

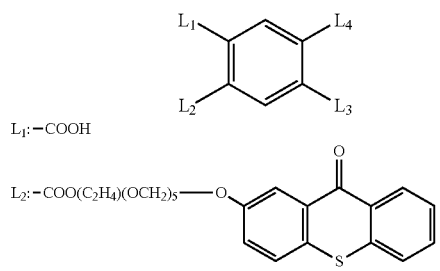

$L_1$: —COOH $L_2$: —COO($C_2H_4$)(OCH$_2$)$_5$—O—

One of $L_3$ and $L_4$ represents the same group as $L_1$ and the other of $L_3$ and $L_4$ represents the same group as $L_2$.

Synthesis Example 6

A total of 25 mL of MEK was placed in a 100 mL flask. Next, 2.29 g (10.0 mmol) of 2-hydroxy-9H-thioxanthone-9-one, manufactured by Chemieliva Pharmaceutical Co., Ltd., 9.17 g (15.0 mmol) of 35-bromo-3,6,9,12,15,21,24,27,30,33-undecaoxa pentatriacontane-1-ol, manufactured by Acrotein ChemBio, and 2.08 g (15.0 mmol) of potassium carbonate were added to the flask followed by heating the resulting mixture for 10 hours while being held at reflux. The liquid mixture was cooled down to room temperature and filtered with filter paper. Thereafter, 30 mL of MDC and 40 mL of deionized water were added to the filtrate followed by stirring for 10 minutes. The organic phase was isolated, followed by distilling away the solvent. The residual was purified by silica gel column chromatograhpy using MDC/methanol at 100:0 to 95:5 (v:v) as eluent. A total of 5.71 g of 2-[(2-(2-(2-(2-(2-(2-(2-(2-(2-(2-(2-(2-hydroxy) ethoxy) ethoxy) ethoxy) ethoxy) ethoxy) ethoxy) ethoxy) ethoxy) ethoxy) ethoxy]-9H-thioxanthene-9-one was thus obtained.

A total of 20 mL of MDC (superdehydrated) and 0.328 g (1.5 mmol) of pyromellitic acid anhydride were placed in a 50 mL flask and dissolved in nitrogen atmosphere. Next, 2.27 g (3.0 mmol) of 2-[(2-(2-(2-(2-(2-(2-(2-(2-(2-(2-(2-(hydroxyethoxy) ethoxy) ethoxy) ethoxy) ethoxy) ethoxy) ethoxy) ethoxy) ethoxy) ethoxy) e thoxy]-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:2 (v:v), followed by recrystallization, resulting in production of 2.02 g of the precursor (TX6) of active energy ray polymerization initiator represented by the following Chemical Formula.

TX6

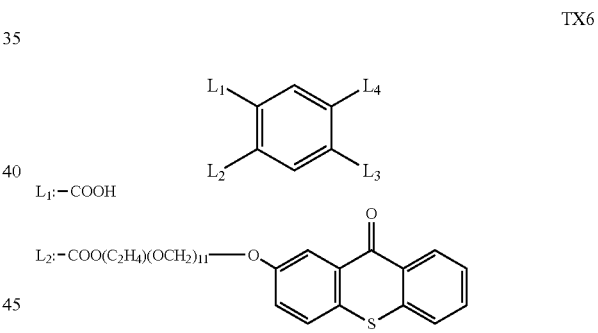

$L_1$: —COOH $L_2$: —COO($C_2H_4$)(OCH$_2$)$_{11}$—O—

One of $L_3$ and $L_4$ represents the same group as $L_1$ and the other of $L_3$ and $L_4$ represents the same group as $L_2$.

Synthesis Example 7

A total of 25 mL of MEK was placed in a 100 mL flask. Next, 2.43 g (10.0 mmol) of 2-hydroxy-1-methyl-9H-thioxanthone-9-one, manufactured by Chemieliva Pharmaceutical Co., Ltd., 2.30 g (15.0 mmol) of 4-bromobutanol, manufactured by TOKYO CHEMICAL INDUSTRY CO., LTD., and 2.08 g (15.0 mmol) of potassium carbonate were added to the flask followed by heating the resulting mixture for 10 hours while being held at reflux. The liquid mixture was cooled down to room temperature, diluted with 50 mL of ethyl acetate, and filtered with filter paper. The filtrate was purged of the solvent. The residual was purified by silica gel column chromatograhpy using toluene/ethyl acetate at 10:0 to 6:4 (v:v) as eluent. A total of 2.63 g of 2-(4-hydroxybu-tanoxy)-1-methyl-9H-thioxanthene-9-one was thus obtained.

A total of 20 mL of MDC (superdehydrated) and 0.328 g (1.5 mmol) of pyromellitic acid anhydride were placed in a 50 mL flask and dissolved in nitrogen atmosphere. Next, 0.95 g (3.0 mmol) of 2-(4-hydroxybutanoxy)-1-methyl-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v) followed by recrystallization, resulting in production of 0.96 g of the precursor (TX7) of active energy ray polymerization initiator represented by the following Chemical Formula.

TX7

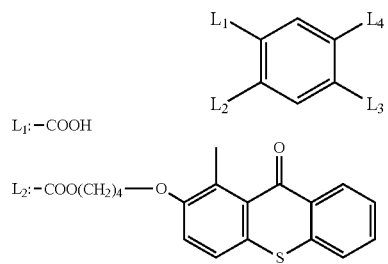

$L_1$: —COOH $L_2$: —COO(CH$_2$)$_4$—O

One of $L_3$ and $L_4$ represents the same group as $L_1$ and the other of $L_3$ and $L_4$ represents the same group as $L_2$.

Synthesis Example 8

A total of 25 mL of MEK was placed in a 100 mL flask. Next, 2.43 g (10.0 mmol) of 2-hydroxy-3-methyl-9H-thioxanthone-9-one, manufactured by Chemieliva Pharmaceutical Co., Ltd., 2.30 g (15.0 mmol) of 4-bromobutanol, manufactured by TOKYO CHEMICAL INDUSTRY CO., LTD., and 2.08 g (15.0 mmol) of potassium carbonate were added to the flask followed by heating the resulting mixture for 10 hours while being held at reflux. The liquid mixture was cooled down to room temperature, diluted with 50 mL of ethyl acetate, and filtered with filter paper. The filtrate was purged of the solvent. The residual was purified by silica gel column chromatograhpy using toluene/ethyl acetate at 10:0 to 6:4 (v:v) as eluent. A total of 2.55 g of 2-(4-hydroxybutanoxy)-3-methyl-9H-thioxanthene-9-one was thus obtained.

A total of 20 mL of MDC (superdehydrated) and 0.328 g (1.5 mmol) of pyromellitic acid anhydride were placed in a 50 mL flask and dissolved in nitrogen atmosphere. Next, 0.95 g (3.0 mmol) of 2-(4-hydroxybutanoxy)-3-methyl-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 1.12 g of the precursor (TX8) of active energy ray polymerization initiator represented by the following Chemical Formula.

TX8

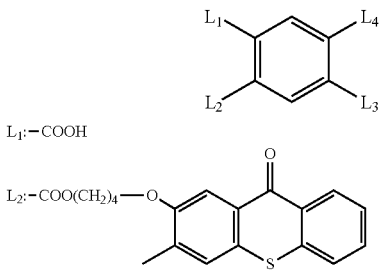

$L_1$: —COOH $L_2$: —COO(CH$_2$)$_4$—O

One of $L_3$ and $L_4$ represents the same group as $L_1$ and the other of $L_3$ and $L_4$ represents the same group as $L_2$.

Synthesis Example 9

A total of 25 mL of MEK was placed in a 100 mL flask. Next, 2.43 g (10.0 mmol) of 2-hydroxy-4-methyl-9H-thioxanthone-9-one, manufactured by Chemieliva Pharmaceutical Co., Ltd., 2.30 g (15.0 mmol) of 4-bromobutanol, manufactured by TOKYO CHEMICAL INDUSTRY CO., LTD., and 2.08 g (15.0 mmol) of potassium carbonate were added to the flask followed by heating the resulting mixture for 10 hours while being held at reflux. The liquid mixture was cooled down to room temperature, diluted with 50 mL of ethyl acetate, and filtered with filter paper. The filtrate was purged of the solvent. The residual was purified by silica gel column chromatograhpy using toluene/ethyl acetate at 10:0 to 6:4 (v:v) as eluent. A total of 2.48 g of 2-(4-hydroxybutanoxy)-4-methyl 9H-thioxanthene-9-one was thus obtained.

A total of 20 mL of MDC (superdehydrated) and 0.328 g (1.5 mmol) of pyromellitic acid anhydride were placed in a 50 mL flask and dissolved in nitrogen atmosphere. Next, 0.95 g (3.0 mmol) of 2-(4-hydroxybutanoxy)-4-methyl-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 1.11 g of the precursor (TX9) of active energy ray polymerization initiator represented by the following Chemical Formula.

TX9

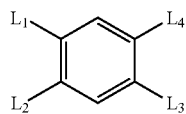

$L_1$: —COOH

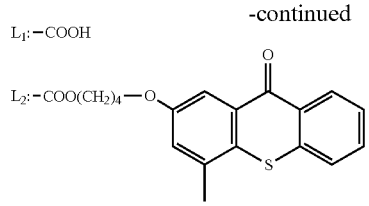

$L_2$: —COO(CH$_2$)$_4$—O

One of $L_3$ and $L_4$ represents the same group as $L_1$ and the other of $L_3$ and $L_4$ represents the same group as $L_2$.

Synthesis Example 10

A total of 25 mL of MEK was placed in a 100 mL flask. Next, 2.71 g (10.0 mmol) of 2-hydroxy-4-isopropyl-9H-thioxanthone-9-one, manufactured by Chemieliva Pharmaceutical Co., Ltd., 2.30 g (15.0 mmol) of 4-bromobutanol, manufactured by TOKYO CHEMICAL INDUSTRY CO., LTD., and 2.08 g (15.0 mmol) of potassium carbonate were added to the flask followed by heating the resulting mixture for 10 hours while being held at reflux. The liquid mixture was cooled down to room temperature, diluted with 50 mL of ethyl acetate, and filtered with filter paper. The filtrate was purged of the solvent. The residual was purified by silica gel column chromatograhpy using toluene/ethyl acetate at 10:0 to 6:4 (v:v) as eluent. A total of 3.06 g of 2-(4-hydroxybutanoxy)-4-isopropyl-9H-thioxanthene-9-one was thus obtained.

A total of 20 mL of MDC (superdehydrated) and 0.328 g (1.5 mmol) of pyromellitic acid anhydride were placed in a 50 mL flask and dissolved in nitrogen atmosphere. Next, 1.03 g (3.0 mmol) of 2-(4-hydroxybutanoxy)-4-isopropyl-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 1.03 g of the precursor (TX10) of active energy ray polymerization initiator represented by the following Chemical Formula.

TX10

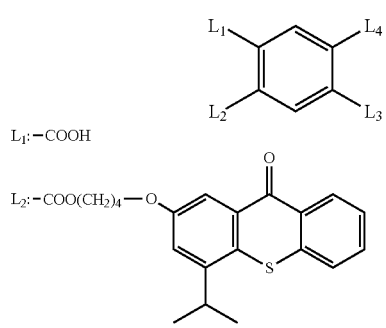

$L_1$: —COOH $L_2$: —COO(CH$_2$)$_4$—O

One of $L_3$ and $L_4$ represents the same group as $L_1$ and the other of $L_3$ and $L_4$ represents the same group as $L_2$.

Synthesis Example 11

A total of 25 mL of MEK was placed in a 100 mL flask. Next, 2.57 g (10.0 mmol) of 2-hydroxy-1,3-dimethyl-9H-thioxanthone-9-one, manufactured by Chemieliva Pharmaceutical Co., Ltd., 2.30 g (15.0 mmol) of 4-bromobutanol, manufactured by TOKYO CHEMICAL INDUSTRY CO., LTD., and 2.08 g (15.0 mmol) of potassium carbonate were added to the flask followed by heating the resulting mixture for 10 hours while being held at reflux. The liquid mixture was cooled down to room temperature, diluted with 50 mL of ethyl acetate, and filtered with filter paper. The filtrate was purged of the solvent. The residual was purified by silica gel column chromatograhpy using toluene/ethyl acetate at 10:0 to 6:4 (v:v) as eluent. A total of 2.85 g of 2-(4-hydroxybutanoxy)-1,3-dimethyl 9H-thioxanthene-9-one was thus obtained.

A total of 20 mL of MDC (superdehydrated) and 0.328 g (1.5 mmol) of pyromellitic acid anhydride were placed in a 50 mL flask and dissolved in nitrogen atmosphere. Next, 0.99 g (3.0 mmol) of 2-(4-hydroxybutanoxy)-1,3-dimethyl-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 1.02 g of the precursor (TX11) of active energy ray polymerization initiator represented by the following Chemical Formula.

TX11

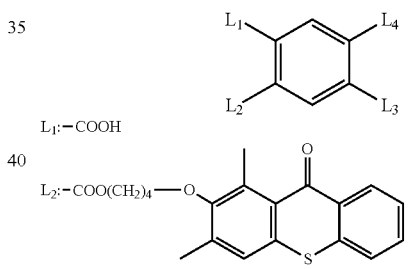

$L_1$: —COOH $L_2$: —COO(CH$_2$)$_4$—O

One of $L_3$ and $L_4$ represents the same group as $L_1$ and the other of $L_3$ and $L_4$ represents the same group as $L_2$.

Synthesis Example 12

A total of 25 mL of MEK was placed in a 100 mL flask. Next, 2.57 g (10.0 mmol) of 2-hydroxy-1,4-dimethyl-9H-thioxanthone-9-one, manufactured by Chemieliva Pharmaceutical Co., Ltd., 2.30 g (15.0 mmol) of 4-bromobutanol, manufactured by TOKYO CHEMICAL INDUSTRY CO., LTD., and 2.08 g (15.0 mmol) of potassium carbonate were added to the flask followed by heating the resulting mixture for 10 hours while being held at reflux. The liquid mixture was cooled down to room temperature, diluted with 50 mL of ethyl acetate, and filtered with filter paper. The filtrate was purged of the solvent. The residual was purified by silica gel column chromatograhpy using toluene/ethyl acetate at 10:0 to 6:4 (v:v) as eluent. A total of 2.79 g of 2-(4-hydroxybutanoxy)-1,4-dimethyl 9H-thioxanthene-9-one was thus obtained.

A total of 20 mL of MDC (superdehydrated) and 0.328 g (1.5 mmol) of pyromellitic acid anhydride were placed in a 50 mL flask and dissolved in nitrogen atmosphere. Next, 0.99 g (3.0 mmol) of 2-(4-hydroxybutanoxy)-1,4-dimethyl-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 1.12 g of the precursor (TX12) of active energy ray polymerization initiator represented by the following Chemical Formula.

TX12

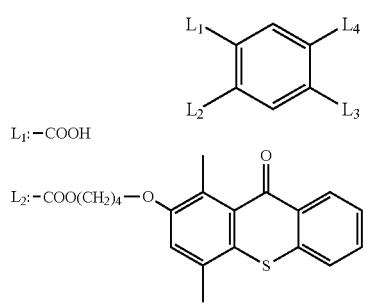

$L_1$:—COOH $L_2$:—COO(CH$_2$)$_4$—O

One of $L_3$ and $L_4$ represents the same group as $L_1$ and the other of $L_3$ and $L_4$ represents the same group as $L_2$.

Synthesis Example 13

A total of 25 mL of MEK was placed in a 100 mL flask. Next, 2.57 g (10.0 mmol) of 2-hydroxy-3,4-dimethyl-9H-thioxanthone-9-one, manufactured by Chemieliva Pharmaceutical Co., Ltd., 2.30 g (15.0 mmol) of 4-bromobutanol, manufactured by TOKYO CHEMICAL INDUSTRY CO., LTD., and 2.08 g (15.0 mmol) of potassium carbonate were added to the flask followed by heating the resulting mixture for 10 hours while being held at reflux. The liquid mixture was cooled down to room temperature, diluted with 50 mL of ethyl acetate, and filtered with filter paper. The filtrate was purged of the solvent. The residual was purified by silica gel column chromatograhpy using toluene/ethyl acetate at 10:0 to 6:4 (v:v) as eluent. A total of 2.88 g of 2-(4-hydroxybutanoxy)-3,4-dimethyl 9H-thioxanthene-9-one was thus obtained.

A total of 20 mL of MDC (superdehydrated) and 0.328 g (1.5 mmol) of pyromellitic acid anhydride were placed in a 50 mL flask and dissolved in nitrogen atmosphere. Next, 0.99 g (3.0 mmol) of 2-(4-hydroxybutanoxy)-3,4-dimethyl-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 1.17 g of the precursor (TX13) of active energy ray polymerization initiator represented by the following Chemical Formula.

TX13

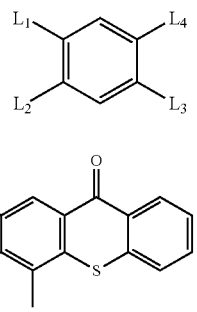

$L_1$:—COOH $L_2$:—COO(CH$_2$)$_4$—O

One of $L_3$ and $L_4$ represents the same group as $L_1$ and the other of $L_3$ and $L_4$ represents the same group as $L_2$.

Synthesis Example 14

A total of 25 mL of MEK was placed in a 100 mL flask. Next, 2.71 g (10.0 mmol) of 2-hydroxy-1,3,4-trimethyl-9H-thioxanthone-9-one, manufactured by Chemieliva Pharmaceutical Co., Ltd., 2.30 g (15.0 mmol) of 4-bromobutanol, manufactured by TOKYO CHEMICAL INDUSTRY CO., LTD., and 2.08 g (15.0 mmol) of potassium carbonate were added to the flask followed by heating the resulting mixture for 10 hours while being held at reflux. The liquid mixture was cooled down to room temperature, diluted with 50 mL of ethyl acetate, and filtered with filter paper." The filtrate was purged of the solvent. The residual was purified by silica gel column chromatograhpy using toluene/ethyl acetate at 10:0 to 6:4 (v:v) as eluent. A total of 2.98 g of 2-(4-hydroxybutanoxy)-1,3,4-trimethyl 9H-thioxanthene-9-one was thus obtained.

A total of 20 mL of MDC (superdehydrated) and 0.328 g (1.5 mmol) of pyromellitic acid anhydride were placed in a 50 mL flask and dissolved in nitrogen atmosphere. Next, 1.03 g (3.0 mmol) of 2-(4-hydroxybutanoxy)-1,3,4-trimethyl-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 1.08 g of the precursor (TX14) of active energy ray polymerization initiator represented by the following Chemical Formula.

TX14

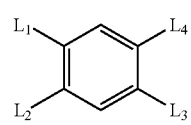

$L_1$: —COOH $L_2$: —COO(CH$_2$)$_4$—O

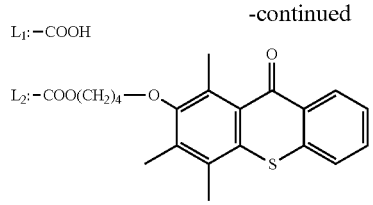

One of $L_3$ and $L_4$ represents the same group as $L_1$ and the other of $L_3$ and $L_4$ represents the same group as $L_2$.

Synthesis Example 15

A total of 25 mL of MEK was placed in a 100 mL flask. Next, 2.29 g (10.0 mmol) of 3-hydroxy-9H-thioxanthone-9-one, manufactured by Chemieliva Pharmaceutical Co., Ltd., 1.88 g (15.0 mmol) of 2-bromoethanol, manufactured by TOKYO CHEMICAL INDUSTRY CO., LTD., and 2.08 g (15.0 mmol) of potassium carbonate were added to the flask followed by heating the resulting mixture for 10 hours while being held at reflux. The liquid mixture was cooled down to room temperature, diluted with 50 mL of ethyl acetate, and filtered with filter paper. The filtrate was purged of the solvent. The residual was purified by silica gel column chromatograhpy using toluene/ethyl acetate at 10:0 to 6:4 (v:v) as eluent. A total of 2.21 g of 3-(2-hydroxyethoxy)-9H-thioxanthene-9-one was thus obtained.

A total of 20 mL of MDC (superdehydrated) and 0.328 g (1.5 mmol) of pyromellitic acid anhydride were placed in a 50 mL flask and dissolved in nitrogen atmosphere. Next, 0.820 g (3.0 mmol) of 3-(2-hydroxyethoxy)-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 0.84 g of the precursor (TX15) of active energy ray polymerization initiator represented by the following Chemical Formula.

TX15

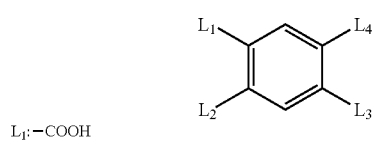

$L_1$: —COOH $L_2$: —COO(CH$_2$)$_2$—O

One of $L_3$ and $L_4$ represents the same group as $L_1$ and the other of $L_3$ and $L_4$ represents the same group as $L_2$.

Synthesis Example 16

A total of 25 mL of MEK was placed in a 100 mL flask. Next, 2.29 g (10.0 mmol) of 4-hydroxy-9H-thioxanthone-9-one, manufactured by Chemieliva Pharmaceutical Co., Ltd., 1.88 g (15.0 mmol) of 2-bromoethanol, manufactured by TOKYO CHEMICAL INDUSTRY CO., LTD., and 2.08 g (15.0 mmol) of potassium carbonate were added to the flask followed by heating the resulting mixture for 10 hours while being held at reflux. The liquid mixture was cooled down to room temperature, diluted with 50 mL of ethyl acetate, and filtered with filter paper. The filtrate was purged of the solvent. The residual was purified by silica gel column chromatograhpy using toluene/ethyl acetate at 10:0 to 6:4 (v:v) as eluent. A total of 2.11 g of 4-(2-hydroxyethoxy)-9H-thioxanthene-9-one was thus obtained.

A total of 20 mL of MDC (superdehydrated) and 0.328 g (1.5 mmol) of pyromellitic acid anhydride were placed in a 50 mL flask and dissolved in nitrogen atmosphere. Next, 0.820 g (3.0 mmol) of 4-(2-hydroxyethoxy)-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 0.92 g of the precursor (TX16) of active energy ray polymerization initiator represented by the following Chemical Formula.

TX16

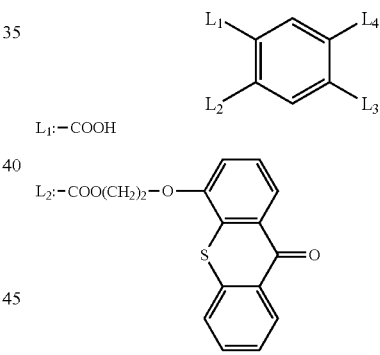

$L_1$: —COOH $L_2$: —COO(CH$_2$)$_2$—O

One of $L_3$ and $L_4$ represents the same group as $L_1$ and the other of $L_3$ and $L_4$ represents the same group as $L_2$.

Synthesis Example 17

A total of 25 mL of MEK was placed in a 100 mL flask. Next, 2.29 g (10.0 mmol) of 1-hydroxy-9H-thioxanthone-9-one, manufactured by Chemieliva Pharmaceutical Co., Ltd., 1.88 g (15.0 mmol) of 2-bromoethanol, manufactured by TOKYO CHEMICAL INDUSTRY CO., LTD., and 2.08 g (15.0 mmol) of potassium carbonate were added to the flask followed by heating the resulting mixture for 10 hours while being held at reflux. The liquid mixture was cooled down to room temperature, diluted with 50 mL of ethyl acetate, and filtered with filter paper. The filtrate was purged of the solvent. The residual was purified by silica gel column chromatograhpy using toluene/ethyl acetate at 10:0 to 6:4 (v:v) as eluent. A total of 2.22 g of 1-(2-hydroxyethoxy)-9H-thioxanthene-9-one was thus obtained.

A total of 20 mL of MDC (superdehydrated) and 0.328 g (1.5 mmol) of pyromellitic acid anhydride were placed in a 50 mL flask and dissolved in nitrogen atmosphere. Next, 0.820 g (3.0 mmol) of 1-(2-hydroxyethoxy)-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 0.93 g of the precursor (TX17) of active energy ray polymerization initiator represented by the following Chemical Formula.

TX17

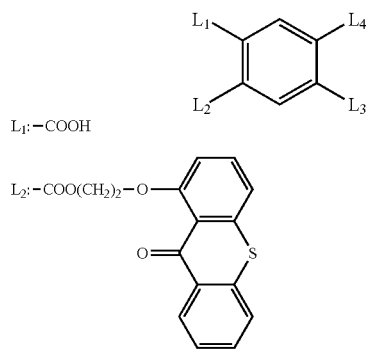

$L_1$: —COOH $L_2$: —COO(CH$_2$)$_2$—O—

One of $L_3$ and $L_4$ represents the same group as $L_1$ and the other of $L_3$ and $L_4$ represents the same group as $L_2$.

Synthesis Example 18

A total of 20 mL of dichloromethane (MDC) (superdehydrated) and 0.443 g (1.5 mmol) of 4,4'-biphthalic acid anhydride, manufactured by TOKYO CHEMICAL INDUSTRY CO., LTD., were placed in a 50 mL flask and dissolved in nitrogen atmosphere. Next, 0.820 g (3.0 mmol) of 2-(2-hydroxyethoxy)-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 0.93 g of the precursor (TX18) of active energy ray polymerization initiator represented by the following Chemical Formula.

TX18

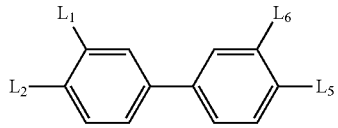

$L_1$: —COOH $L_2$: —COO(CH$_2$)$_2$—O—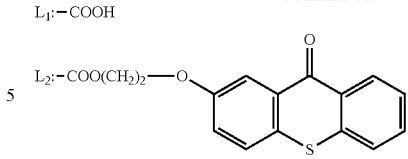

One of $L_3$ and $L_4$ represents the same group as $L_1$ and the other of $L_3$ and $L_4$ represents the same group as $L_2$.

Synthesis Example 19

A total of 20 mL of MDC (superdehydrated) and 0.442 g (1.5 mmol) of 4,4'-biphthalic acid anhydride were placed in a 50 mL flask and dissolved in nitrogen atmosphere. Next, 0.99 g (3.0 mmol) of 2-(6-hydroxyhexanoxy)-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 ml of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 1.06 g of the precursor (TX19) of active energy ray polymerization initiator represented by the following Chemical Formula.

TX19

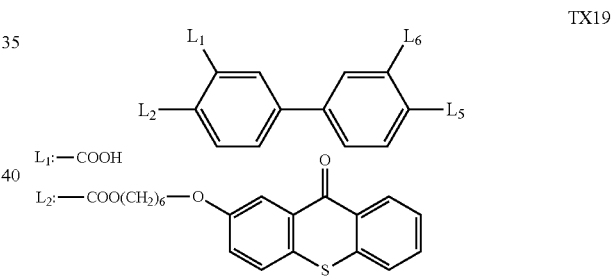

$L_1$: —COOH $L_2$: —COO(CH$_2$)$_6$—O—

One of $L_3$ and $L_4$ represents the same group as $L_1$ and the other of $L_3$ and $L_4$ represents the same group as $L_2$.

Synthesis Example 20

A total of 20 mL of MDC (superdehydrated) and 0.442 g (1.5 mmol) of 4,4'-biphthalic acid anhydride were placed in a 50 mL flask and dissolved in nitrogen atmosphere. Next, 1.24 g (3.0 mmol) of 2-(12-hydroxybutanoxy)-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 1.25 g of the precursor (TX20) of active energy ray polymerization initiator represented by the following Chemical Formula.

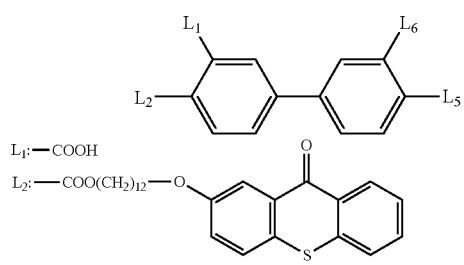

One of L₃ and L₄ represents the same group as L₁ and the other of L₃ and L₄ represents the same group as L₂.

Synthesis Example 21

A total of 20 mL of MDC (superdehydrated) and 0.442 g (1.5 mmol) of 4,4'-biphthalic acid anhydride were placed in a 50 mL flask and dissolved in nitrogen atmosphere. Next, 0.95 g (3.0 mmol) of 2-[2-(2-hydroxyethoxy)-ethoxy]-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:2 (v:v), followed by recrystallization, resulting in production of 1.09 g of the precursor (TX21) of active energy ray polymerization initiator represented by the following Chemical Formula.

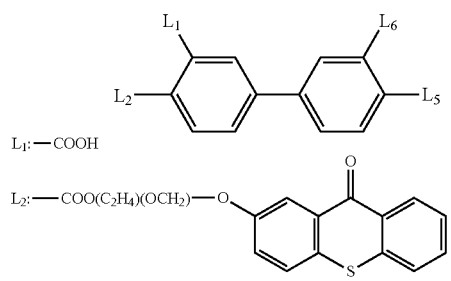

One of L₃ and L₄ represents the same group as L₁ and the other of L₃ and L₄ represents the same group as L₂.

Synthesis Example 22

A total of 20 mL of MDC (superdehydrated) and 0.442 g (1.5 mmol) of 4,4'-biphthalic acid anhydride were placed in a 50 mL flask and dissolved in nitrogen atmosphere. Next, 1.48 g (3.0 mmol) of 2-[(2-(2-(2-(2-(2-(2hydroxyethoxy) ethoxy) ethoxy) ethoxy) ethoxy]-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:2 (v:v), followed by recrystallization, resulting in production of 1.39 g of the precursor (TX22) of active energy ray polymerization initiator represented by the following Chemical Formula.

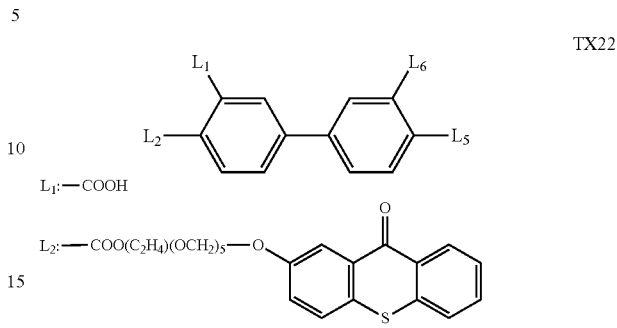

One of L₃ and L₄ represents the same group as L₁ and the other of L₃ and L₄ represents the same group as L₂.

Synthesis Example 23

A total of 20 mL of MDC (superdehydrated) and 0.442 g (1.5 mmol) of 4,4'-biphthalic acid anhydride were placed in a 50 mL flask and dissolved in nitrogen atmosphere. Next, 2.27 g mmol) of 2-[(2-(2-(2-(2-(2-(2-(2-(2-(2-(2-(2-(3.0 (hydroxyethoxy) ethoxy) ethoxy) ethoxy) ethoxy) ethoxy) ethoxy) ethoxy) ethoxy) ethoxy) e thoxy]-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:2 (v:v), followed by recrystallization, resulting in production of 2.08 g of the precursor (TX23) of active energy ray polymerization initiator represented by the following Chemical Formula.

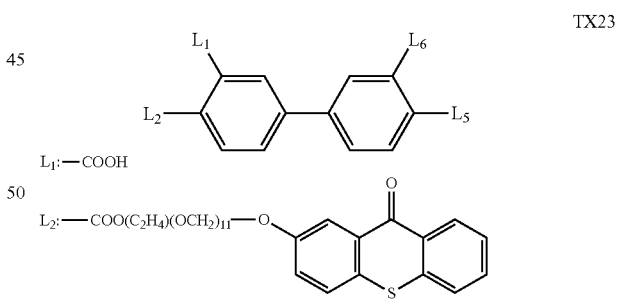

One of L₃ and L₄ represents the same group as L₁ and the other of L₃ and L₄ represents the same group as L₂.

Synthesis Example 24

A total of 20 mL of MDC (superdehydrated) and 0.442 g (1.5 mmol) of 4,4'-biphthalic acid anhydride were placed in a 50 mL flask and dissolved in nitrogen atmosphere. Next, 0.95 g (3.0 mmol) of 2-(4-hydroxybutanoxy)-1-methyl-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 1.07 g of the precursor (TX24) of active energy ray polymerization initiator represented by the following Chemical Formula.

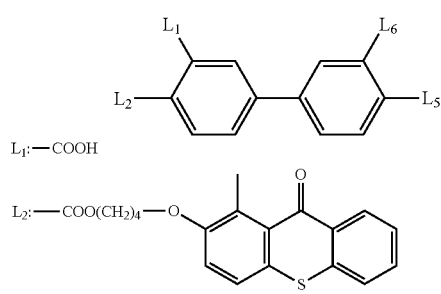

TX24

$L_1$: —COOH $L_2$: —COO(CH$_2$)$_4$—O

One of $L_3$ and $L_4$ represents the same group as $L_1$ and the other of $L_3$ and $L_4$ represents the same group as $L_2$.

Synthesis Example 25

A total of 20 mL of MDC (superdehydrated) and 0.442 g (1.5 mmol) of 4,4'-biphthalic acid anhydride were placed in a 50 mL flask and dissolved in nitrogen atmosphere. Next, 0.95 g (3.0 mmol) of 2-(4-hydroxybutanoxy)-3-methyl-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 1.01 g of the precursor (TX25) of active energy ray polymerization initiator represented by the following Chemical Formula.

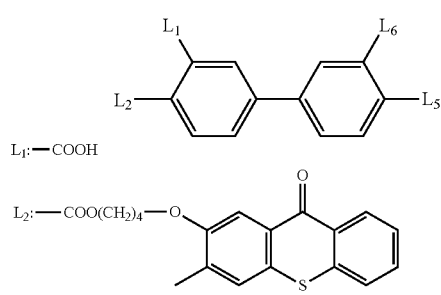

TX25

$L_1$: —COOH $L_2$: —COO(CH$_2$)$_4$—O

One of $L_3$ and $L_4$ represents the same group as $L_1$ and the other of $L_3$ and $L_4$ represents the same group as $L_2$.

Synthesis Example 26

A total of 20 mL of MDC (superdehydrated) and 0.442 g (1.5 mmol) of 4,4'-biphthalic acid anhydride were placed in a 50 mL flask and dissolved in nitrogen atmosphere. Next, 0.95 g (3.0 mmol) of 2-(4-hydroxybutanoxy)-4-methyl-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 0.993 g of the precursor (TX26) of active energy ray polymerization initiator represented by the following Chemical Formula.

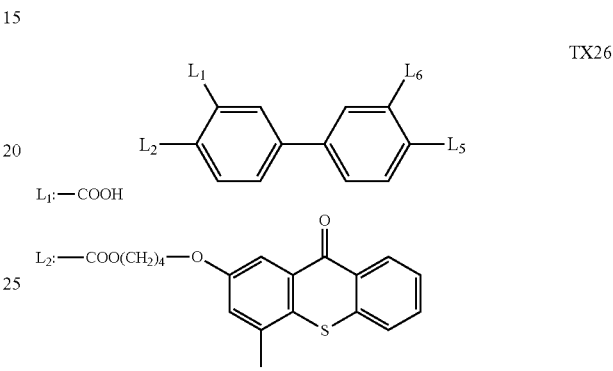

TX26

$L_1$: —COOH $L_2$: —COO(CH$_2$)$_4$—O

One of $L_3$ and $L_4$ represents the same group as $L_1$ and the other of $L_3$ and $L_4$ represents the same group as $L_2$.

Synthesis Example 27

A total of 20 mL of MDC (superdehydrated) and 0.442 g (1.5 mmol) of 4,4'-biphthalic acid anhydride were placed in a 50 mL flask and dissolved in nitrogen atmosphere. Next, 1.03 g (3.0 mmol) of 2-(4-hydroxybutanoxy)-4-isopropyl-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 2.34 g of the precursor (TX27) of active energy ray polymerization initiator represented by the following Chemical Formula.

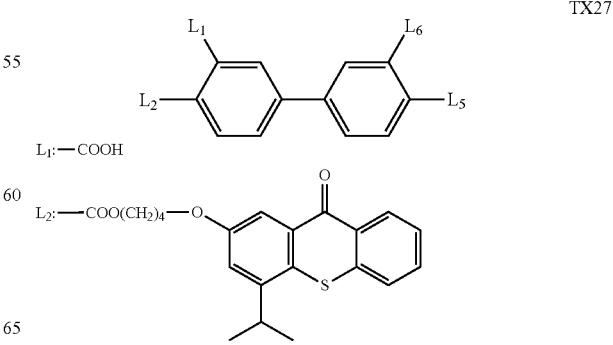

TX27

$L_1$: —COOH $L_2$: —COO(CH$_2$)$_4$—O

One of $L_3$ and $L_4$ represents the same group as $L_1$ and the other of $L_3$ and $L_4$ represents the same group as $L_2$.

Synthesis Example 28

A total of 20 mL of MDC (superdehydrated) and 0.442 g (1.5 mmol) of 4,4'-biphthalic acid anhydride were placed in a 50 mL flask and dissolved in nitrogen atmosphere. Next, 0.99 g (3.0 mmol) of 2-(4-hydroxybutanoxy)-1,3-dimethyl-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 1.04 g of the precursor (TX28) of active energy ray polymerization initiator represented by the following Chemical Formula.

TX28

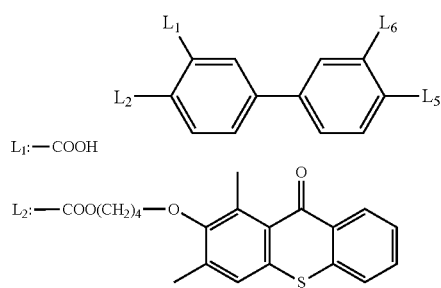

$L_1$: —COOH $L_2$: —COO(CH$_2$)$_4$—O—

One of $L_3$ and $L_4$ represents the same group as $L_1$ and the other of $L_3$ and $L_4$ represents the same group as $L_2$.

Synthesis Example 29

A total of 20 mL of MDC (superdehydrated) and 0.442 g (1.5 mmol) of 4,4'-biphthalic acid anhydride were placed in a 50 mL flask and dissolved in nitrogen atmosphere. Next, 0.99 g (3.0 mmol) of 2-(4-hydroxybutanoxy)-1,4-dimethyl-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 1.19 g of the precursor (TX29) of active energy ray polymerization initiator represented by the following Chemical Formula.

TX29

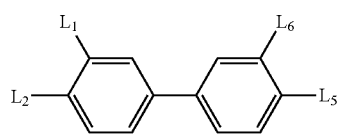

$L_1$: —COOH $L_2$: —COO(CH$_2$)$_4$—O—

One of $L_3$ and $L_4$ represents the same group as $L_1$ and the other of $L_3$ and $L_4$ represents the same group as $L_2$.

Synthesis Example 30

A total of 20 mL of MDC (superdehydrated) and 0.442 g (1.5 mmol) of 4,4'-biphthalic acid anhydride were placed in a 50 mL flask and dissolved in nitrogen atmosphere. Next, 0.99 g (3.0 mmol) of 2-(4-hydroxybutanoxy)-3,4-dimethyl-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 1.11 g of the precursor (TX30) of active energy ray polymerization initiator represented by the following Chemical Formula.

TX30

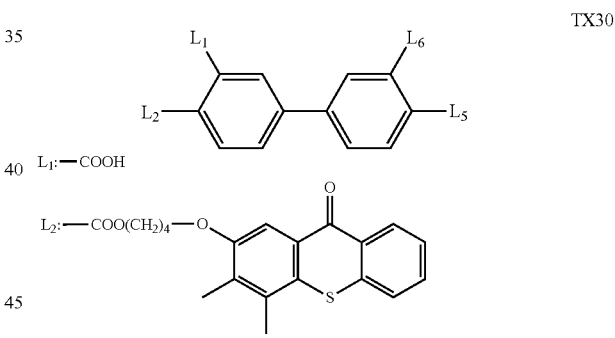

$L_1$: —COOH $L_2$: —COO(CH$_2$)$_4$—O—

One of $L_3$ and $L_4$ represents the same group as $L_1$ and the other of $L_3$ and $L_4$ represents the same group as $L_2$.

Synthesis Example 31

A total of 20 mL of MDC (superdehydrated) and 0.442 g (1.5 mmol) of 4,4'-biphthalic acid anhydride were placed in a 50 mL flask and dissolved in nitrogen atmosphere. Next, 1.03 g (3.0 mmol) of 2-(4-hydroxybutanoxy)-1,3,4-trimethyl-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 1.00 g of the precursor (TX31) of active energy ray polymerization initiator represented by the following Chemical Formula.

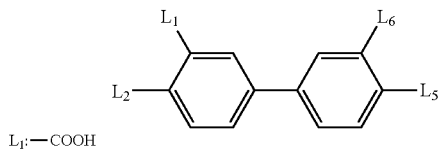
TX31

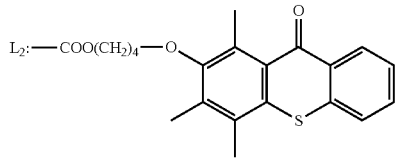

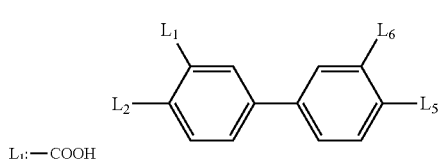
TX31

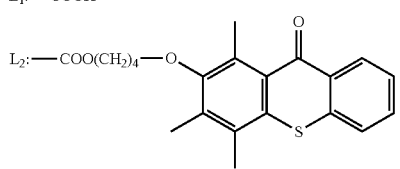

Synthesis Example 32

A total of 20 mL of MDC (superdehydrated) and 0.442 g (1.5 mmol) of 4,4'-biphthalic acid anhydride were placed in a 50 mL flask and dissolved in nitrogen atmosphere. Next, 0.820 g (3.0 mmol) of 3-(2-hydroxyethoxy)-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 0.89 g of the precursor (TX32) of active energy ray polymerization initiator represented by the following Chemical Formula.

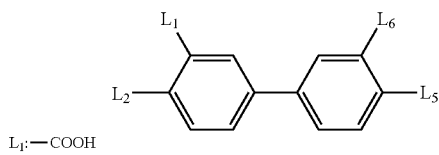
TX32

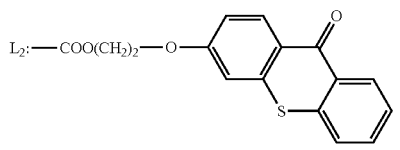

One of $L_3$ and $L_4$ represents the same group as $L_1$ and the other of $L_3$ and $L_4$ represents the same group as $L_2$.

Synthesis Example 33

A total of 20 mL of MDC (superdehydrated) and 0.442 g (1.5 mmol) of 4,4'-biphthalic acid anhydride were placed in a 50 mL flask and dissolved in nitrogen atmosphere. Next, 0.820 g (3.0 mmol) of 4-(2-hydroxyethoxy)-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 0.81 g of the precursor (TX33) of active energy ray polymerization initiator represented by the following Chemical Formula.

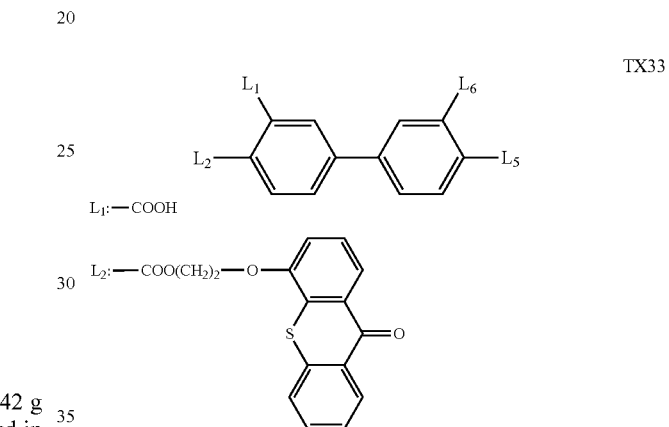
TX33

One of $L_3$ and $L_4$ represents the same group as $L_1$ and the other of $L_3$ and $L_4$ represents the same group as $L_2$.

Synthesis Example 34

A total of 20 mL of MDC (superdehydrated) and 0.442 g (1.5 mmol) of 4,4'-biphthalic acid anhydride were placed in a 50 mL flask and dissolved in nitrogen atmosphere. Next, 0.820 g (3.0 mmol) of 1-(2-hydroxyethoxy)-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 0.90 g of the precursor (TX34) of active energy ray polymerization initiator represented by the following Chemical Formula.

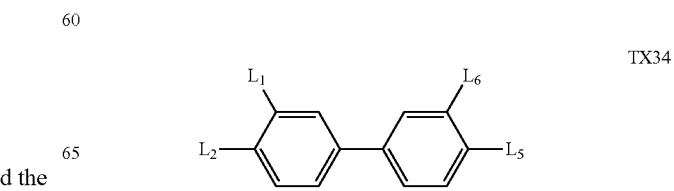
TX34

L₁: —COOH

L₂: —COO(CH₂)₂—O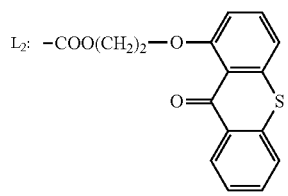

One of L₃ and L₄ represents the same group as L₁ and the other of L₃ and L₄ represents the same group as L₂.

Synthesis Example 35

A total of 20 mL of MDC (superdehydrated) and 0.466 g (1.5 mmol) of 4,4'-oxydiphtalic acid anhydride were placed in a 50 mL flask and dissolved in nitrogen atmosphere. Next, 0.99 g (3.0 mmol) of 2-(4-hydroxybutanoxy)-3,4-dimethyl-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 1.08 g of the precursor (TX35) of active energy ray polymerization initiator represented by the following Chemical Formula.

TX36

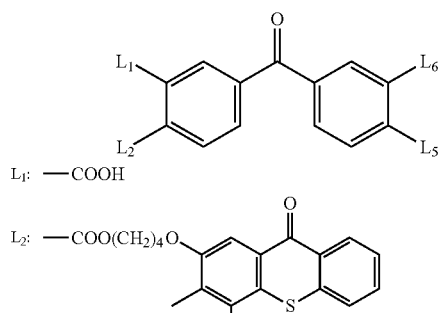

L₁: —COOH

L₂: —COO(CH₂)₄O—

One of L₃ and L₄ represents the same group as L₁ and the other of L₃ and L₄ represents the same group as L₂.

Synthesis Example 36

A total of 20 mL of MDC (superdehydrated) and 0.484 g (1.5 mmol) of 3,3',4,4'-benzophenone tetracarboxylic acid anhydride were placed in a 50 mL flask and dissolved in nitrogen atmosphere. Next, 0.99 g (3.0 mmol) of 2-(4-hydroxybutanoxy)-3,4-dimethyl-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 1.11 g of the precursor (TX36) of active energy ray polymerization initiator represented by the following Chemical Formula.

TX35

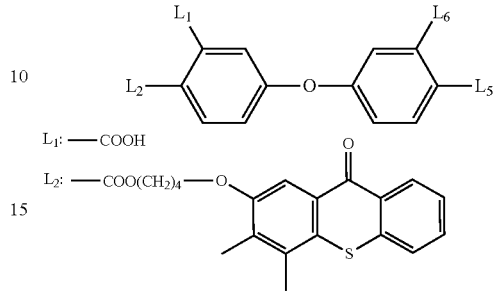

L₁: —COOH

L₂: —COO(CH₂)₄—O

One of L₄ and L₄ represents the same group as L₁ and the other of L₃ and L₄ represents the same group as L₂.

Synthesis Example 37

A total of 20 mL of MDC (superdehydrated) and 0.667 g (1.5 mmol) of 4,4'-(hexafluoro isoprobilidene) diphthalic acid anhydride were placed in a 50 mL flask and dissolved in nitrogen atmosphere. Next, 0.99 g (3.0 mmol) of 2-(4-hydroxybutanoxy)-3,4-dimethyl-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere.

Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 1.23 g of the precursor (TX37) of active energy ray polymerization initiator represented by the following Chemical Formula.

TX37

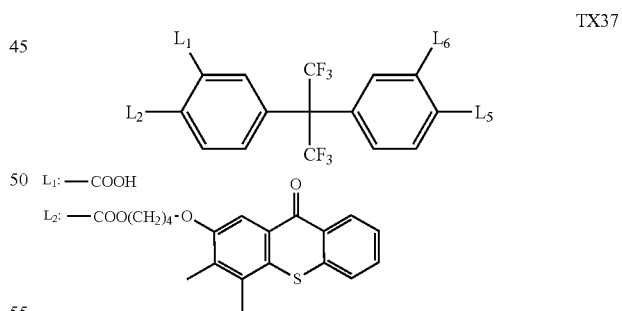

L₁: —COOH

L₂: —COO(CH₂)₄-O

One of L₃ and L₄ represents the same group as L₁ and the other of L₃ and L₄ represents the same group as L₂.

Synthesis Example 38

A total of 20 mL of MDC (superdehydrated) and 0.538 g (1.5 mmol) of 3,3',4,4'-diphenyl sulfone tetracarboxylic acid anhydride were placed in a 50 mL flask and dissolved in nitrogen atmosphere. Next, 0.99 g (3.0 mmol) of 2-(4-hydroxybutanoxy)-3,4-dimethyl-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 1.14 g of the precursor (TX38) of active energy ray polymerization initiator represented by the following Chemical Formula.

TX38

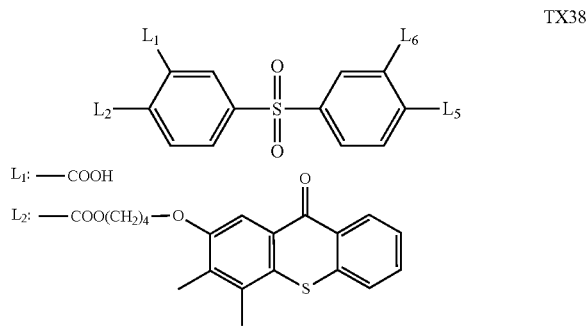

$L_1$: —COOH $L_2$: —COO(CH$_2$)$_4$—O—

One of $L_3$ and $L_4$ represents the same group as $L_1$ and the other of $L_3$ and $L_4$ represents the same group as $L_2$.

Synthesis Example 39

A total of 20 mL of MDC (superdehydrated) and 0.781 g (1.5 mmol) of 4,4'-(4,4'-isopropuridene diphenoxy) disphtalic acid anhydride were placed in a 50 mL flask and dissolved in nitrogen atmosphere. Next, 0.99 g (3.0 mmol) of 2-(4-hydroxybutanoxy)-3,4-dimethyl-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 1.29 g of the precursor (TX39) of active energy ray polymerization initiator represented by the following Chemical Formula.

TX29

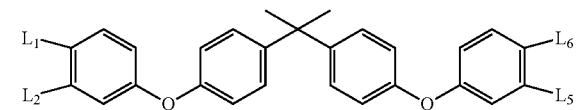

$L_1$: —COOH $L_2$: —COO(CH$_2$)$_4$O—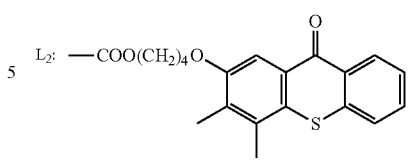

One of $L_3$ and $L_4$ represents the same group as $L_1$ and the other of $L_3$ and $L_4$ represents the same group as $L_2$.

Synthesis Example 40

A total of 20 mL of MDC (superdehydrated) and 0.688 g (1.5 mmol) of bis(1,3-dioxo-1,3-dihydroisobenzofuran-5-carboxylic acid) 1,4-phenylene were placed in a 50 mL flask and dissolved in nitrogen atmosphere. Next, 0.99 g (3.0 mmol) of 2-(4-hydroxybutanoxy)-3,4-dimethyl-9H-thioxanthene-9-one was added to the solution and dissolved in the flask. Thereafter, 0.367 g (3.0 mmol) of dimethyl aminopyridine was added followed by stirring for 24 hours at room temperature in nitrogen atmosphere. Then, 150 mL of MDC was added. The resulting mixture was rinsed with 150 mL of salt water three times to isolate the organic phase, followed by distilling the solvent away from the organic phase. The residual was heated and dissolved in toluene/isopropanol at 1:3 (v:v), followed by recrystallization, resulting in production of 1.31 g of the precursor (TX40) of active energy ray polymerization initiator represented by the following Chemical Formula.

TX40

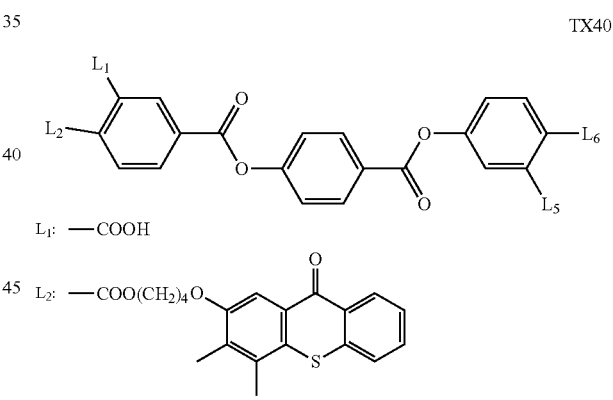

$L_1$: —COOH $L_2$: —COO(CH$_2$)$_4$O—

One of $L_3$ and $L_4$ represents the same group as $L_1$ and the other of $L_3$ and $L_4$ represents the same group as $L_2$.

The precursors of the active energy ray polymerization initiators synthesized as described above are shown in Table 1.

TABLE 1

| | | | Precursor of active energy ray polymerization initiator | | |
| | | | | —(R)$_n$ | |
| Synthesis Example | Name | n | R$_1$ (site) | R$_2$ (site) | R$_3$ (site) |
|---|---|---|---|---|---|
| 1 | TX1 | 0 | — | — | — |
| 2 | TX2 | 0 | — | — | — |

TABLE 1-continued

| | | | | | |
|---|---|---|---|---|---|
| 3 | TX3 | 0 | — | — | — |
| 4 | TX4 | 0 | — | — | — |
| 5 | TX5 | 0 | — | — | — |
| 6 | TX6 | 0 | — | — | — |
| 7 | TX7 | 1 | —$CH_3$(1) | — | — |
| 8 | TX8 | 1 | —$CH_3$(3) | — | — |
| 9 | TX9 | 1 | —$CH_3$(4) | — | — |
| 10 | TX10 | 1 | —$CH(CH_3)_2$(4) | — | — |
| 11 | TX11 | 2 | —$CH_3$(1) | —$CH_3$(3) | — |
| 12 | TX12 | 2 | —$CH_3$(1) | —$CH_3$(4) | — |
| 13 | TX13 | 2 | —$CH_3$(3) | —$CH_3$(4) | — |
| 14 | TX14 | 3 | —$CH_3$(1) | —$CH_3$(3) | —$CH_3$(4) |
| 15 | TX15 | 0 | — | — | — |
| 16 | TX16 | 0 | — | — | — |
| 17 | TX17 | 0 | — | — | — |
| 18 | TX18 | 0 | — | — | — |
| 19 | TX19 | 0 | — | — | — |
| 20 | TX20 | 0 | — | — | — |
| 21 | TX21 | 0 | — | — | — |
| 22 | TX22 | 0 | — | — | — |
| 23 | TX23 | 0 | — | — | — |
| 24 | TX24 | 1 | —$CH_3$ (1) | — | — |
| 25 | TX25 | 1 | —$CH_3$ (3) | — | — |
| 26 | TX26 | 1 | —$CH_3$ (4) | — | — |
| 27 | TX27 | 1 | —$CH(CH_3)_2$ (4) | — | — |
| 28 | TX28 | 2 | —$CH_3$ (1) | —$CH_3$ (3) | -covalent |
| 29 | TX29 | 2 | —$CH_3$ (1) | —$CH_3$ (4) | — |
| 30 | TX30 | 2 | —$CH_3$ (3) | —$CH_3$ (4) | — |
| 31 | TX31 | 3 | —$CH_3$ (1) | —$CH_3$ (3) | —$CH_3$ (4) |
| 32 | TX32 | 0 | — | — | — |
| 33 | TX33 | 0 | — | — | — |
| 34 | TX34 | 0 | — | — | — |
| 35 | TX35 | 2 | —$CH_3$ (3) | —$CH_3$ (4) | — |
| 36 | TX36 | 2 | —$CH_3$ (3) | —$CH_3$ (4) | — |
| 37 | TX37 | 2 | —$CH_3$ (3) | —$CH_3$ (4) | — |
| 38 | TX38 | 2 | —$CH_3$ (3) | —$CH_3$ (4) | — |
| 39 | TX39 | 2 | —$CH_3$ (3) | —$CH_3$ (4) | — |
| 40 | TX40 | 2 | —$CH_3$ (3) | —$CH_3$ (4) | — |

| | | Precursor of active energy ray polymerization initiator | | | | |
|---|---|---|---|---|---|---|
| Synthesis | | —O-Link 1- | | | | |
| Example | Name | Site of —O | -Link 1- | x | y | -Link 2- |
| 1 | TX1 | 2 | —$(CH_2)_2$— | 2 | 0 | — |
| 2 | TX2 | 2 | —$(CH_2)_6$— | 6 | 0 | — |
| 3 | TX3 | 2 | —$(CH_2)_{12}$— | 12 | 0 | — |
| 4 | TX4 | 2 | —$C_2H_4OC_2H_4$— | 2 | 1 | — |
| 5 | TX5 | 2 | —$C_2H_4$—$(OC_2H_4)_5$— | 2 | 5 | — |
| 6 | TX6 | 2 | —$C_2H_4$—$(OC_2H_4)_{11}$— | 2 | 11 | — |
| 7 | TX7 | 2 | —$(CH_2)_4$— | 4 | 0 | — |
| 8 | TX8 | 2 | —$(CH_2)_4$— | 4 | 0 | — |
| 9 | TX9 | 2 | —$(CH_2)_4$— | 4 | 0 | — |
| 10 | TX10 | 2 | —$(CH_2)_4$— | 4 | 0 | — |
| 11 | TX11 | 2 | —$(CH_2)_4$— | 4 | 0 | — |
| 12 | TX12 | 2 | —$(CH_2)_4$— | 4 | 0 | — |
| 13 | TX13 | 2 | —$(CH_2)_4$— | 4 | 0 | — |
| 14 | TX14 | 2 | —$(CH_2)_4$— | 4 | 0 | — |
| 15 | TX15 | 3 | —$(CH_2)_2$— | 2 | 0 | — |
| 16 | TX16 | 4 | —$(CH_2)_2$— | 2 | 0 | — |
| 17 | TX17 | 1 | —$(CH_2)_2$— | 2 | 0 | — |
| 18 | TX18 | 2 | —$(CH_2)_2$— | 2 | 0 | Single bond |
| 19 | TX19 | 2 | —$(CH_2)_6$— | 6 | 0 | Single bond |
| 20 | TX20 | 2 | —$(CH_2)_{12}$— | 12 | 0 | Single bond |
| 21 | TX21 | 2 | —$C_2H_4OC_2H_4$— | 2 | 1 | Single bond |
| 22 | TX22 | 2 | —$C_2H_4$—$(OC_2H_4)_5$— | 2 | 5 | Single bond |
| 23 | TX23 | 2 | —$C_2H_4$—$(OC_2H_4)_{11}$— | 2 | 11 | Single bond |
| 24 | TX24 | 2 | —$(CH_2)_4$— | 4 | 0 | Single bond |
| 25 | TX25 | 2 | —$(CH_2)_4$— | 4 | 0 | Single bond |
| 26 | TX26 | 2 | —$(CH_2)_4$— | 4 | 0 | Single bond |
| 27 | TX27 | 2 | —$(CH_2)_4$— | 4 | 0 | Single bond |
| 28 | TX28 | 2 | —$(CH_2)_4$— | 4 | 0 | Single bond |
| 29 | TX29 | 2 | —$(CH_2)_4$— | 4 | 0 | Single bond |
| 30 | TX30 | 2 | —$(CH_2)_4$— | 4 | 0 | Single bond |
| 31 | TX31 | 2 | —$(CH_2)_4$— | 4 | 0 | Single bond |
| 32 | TX32 | 3 | —$(CH_2)_2$— | 2 | 0 | Single bond |
| 33 | TX33 | 4 | —$(CH_2)_2$— | 2 | 0 | Single bond |
| 34 | TX34 | 1 | —$(CH_2)_2$— | 2 | 0 | Single bond |
| 35 | TX35 | 2 | —$(CH_2)_4$— | 4 | 0 | —O— |

TABLE 1-continued

| 36 | TX36 | 2 | —(CH$_2$)$_4$— | 4 | 0 | —CO— |
| 37 | TX37 | 2 | —(CH$_2$)$_4$— | 4 | 0 | —C(CF$_3$)$_2$C— |
| 38 | TX38 | 2 | —(CH$_2$)$_4$— | 4 | 0 | —SO$_2$— |
| 39 | TX39 | 2 | —(CH$_2$)$_4$— | 4 | 0 | —O—Ph—C(CH$_3$)$_2$—Ph—O— |
| 40 | TX40 | 2 | —(CH$_2$)$_4$— | 4 | 0 | —COO—Ph—OCO— |

Comparative Synthesis Example 1

A total of 4.57 g (20 mmol) of 2-hydroxythioxanthone, 5.99 g (24 mmol) of 1-bromododecane, and 4.15 g (30.0 mmol)? of potassium were added to 60 mL of MEK, followed by heating the liquid mixture for 10 hours while being held at reflux and cooling down. The reaction solution thus obtained was diluted with 600 mL of ethyl acetate, followed by filtering with filter paper. The filtrate was condensed and the residual was purified by silica gel column chromatography using toluene, thereby obtaining 6.98 g of 2-dodecyloxy thioxanthone as the active energy ray polymerization initiator (Ref-1).

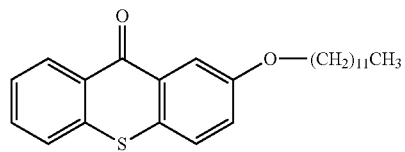

(Ref-1)

Comparative Synthesis Example 2

A total of 3.97 g (20 mmpl) of 2-hydroxy benzophenone, manufactured by FUJIFILM Wako Pure Corporation, 5.90 g (24 mmol) of 12-bromododecane, manufactured by TOKYO CHEMICAL INDUSTRY CO., LTD., and 4.15 g of potassium carbonate were added to 60 mL of methylethyl ketone, followed by heating the liquid mixture for 10 hours while being held at reflux and cooling down to room temperature. The reaction solution obtained was filtered with filter paper. The filtrate was condensed and the residual was purified by silica gel column chromatography using toluene, thereby obtaining 6.32 g of (2-(dodecyloxy)phenyl(phenyl)methanone as the active energy ray polymerization initiator (Ref-2).

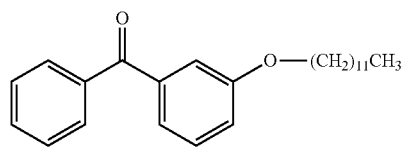

(Ref-2)

Comparative Synthesis Example 3

A total of 100 mL of MEK was placed in a 300 mL flask. Next, 8.17 g (60.0 mmol) of 1-(4-hydroxyphenyl)ethanone, manufactured by TOKYO CHEMICAL INDUSTRY CO., LTD., 33.8 g (180 mmol) of 1,2-dibromoethane, manufactured by TOKYO CHEMICAL INDUSTRY CO., LTD., and 24.9 g (180 mmol) of potassium carbonate were added to the flask followed by heating the resulting mixture for 10 hours while being held at reflux. The liquid mixture was cooled down to room temperature, diluted with 100 mL of ethyl acetate, and filtered with filter paper. The filtrate was purged of the solvent. The residual was purified by silica gel column chromatography using toluene/ethyl acetate at 10:0 to 6:4 (v:v) as eluent. A total of 11.2 g of 1-(4-(2-bromoethoxy)phenyl)ethanone.

A total of 60 mL of MEK was placed in a 100 mL flask. Next, 9.13 g (40.0 mmol) of 2-hydroxy-9H-thioxanthone-9-one, manufactured by Chemieliva Pharmaceutical Co., Ltd., 9.72 g (40.0 mmol) of 1-(4-(2-bromoethoxy)phenyl)ethanone, and 6.63 g (48 mmol) of potassium carbonate were added to the flask followed by heating the resulting mixture for 10 hours while being held at reflux. The liquid mixture was cooled down to room temperature, diluted with 60 mL of ethyl acetate, and filtered with filter paper. The filtrate was purged of the solvent. The residual was purified by silica gel column chromatography using toluene/ethyl acetate at 10:0 to 6:4 (v:v) as eluent. A total of 11.6 g of 2-(2-(4-methylcarbonyl)phenoxyethoxy)-9H-thioxanthene-9-one was thus obtained.

Next, 50 mL of dimethylformamide was placed in a 100 mL flask. Next, 9.76 g (25.0 mmol) of 2-(2-(4-methylcarbophenyl) phenoxyethoxy)-9H-thioxanthene-9-one was thus obtained. Thereafter, 2.61 g (37.5 mmol) of hydroxy amine was added. The system was stirred at 80 degrees C. for 4 hours, followed by cooling down to room temperature. The reaction product precipitated was filtered, rinsed with water, and dried, thereby 9.98 g of 4-(2-(9H-thioxanthene-9-one-2-yl)oxyethoxy)phenyl methyl ketoxime.

Next, 50 mL of ethyl acetate was placed in 100 mL of flask. Next, 8.11 g (20.0 mmol) of 4-(2-(9H-thioxhantene-9-one-2-yl)oxyethoxy)phenyl methylketoxime was added and dissolved in the flask. Thus, 3.06 g (30.0 mmol) of acetic acid anhydride was obtained. After heating and stirring for six hours while being held at reflux, the system was cooled down to room temperature. A total of 50 mL of hexane was added, followed by stirring for one hour. The precipitated product was filtered and dried, thereby obtaining 5.67 g of active energy ray polymerization initiator (Ref-3).

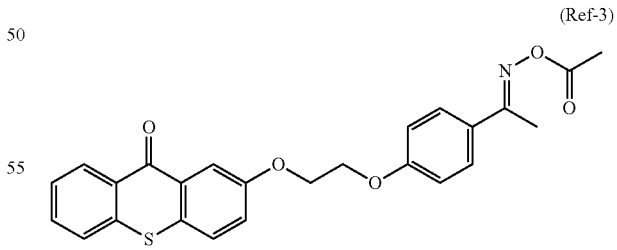

(Ref-3)

Preparation of Active Energy Ray Polymerization Initiator

Examples 1 to 7

The precursor (TX1) of active energy ray polymerization initiator and, as tertiary amine (Z), 2-(dimethylamino)ethanol (Z1), 2-(dimethylamino)-1-propanol (Z2), 2-(diethylamino)ethanol (Z3), 2-[2-(diethylamino)ethoxy]ethanol (Z4), N-methyl diethanol amine (Z5), N-ethyl dietanol amine (Z6), or 1-[bis(2-hydroxyethyl)amino]-2-propanol (Z7) were mixed in equal mole, thereby obtaining the active energy ray polymerization initiators of (TX1-Z1), (TX1-Z2), (TX1-Z3), (TX1-Z4), (TX1-Z5), (TX1-Z6), and (TX1-Z7) of Examples 1 to 7.

Examples 8 to 9

The precursor (TX2) or (TX3) and 2-(dimethylamino) ethanol (Z1) as tertiary amine (Z) were mixed in equal mole. The active energy ray polymerization initiators (TX2-Z1) and (TX3-Z1) of Examples 8 and 9 were thus obtained.

Examples 10 to 16

The precursor (TX4) and, as tertiary amine (Z), 2-(dimethylamino)ethanol (Z1), 2-(dimethylamino)-1-propanol (Z2), 2-(diethylamino)ethanol (Z3), 2-[2-(diethylamino) ethoxy]ethanol (Z4), N-methyl diethanol amine (Z5). N-ethyl dietanol amine (Z6), or 1-[bis(2-hydroxyethyl) amino]-2-propanol (Z7) were mixed in equal mole, thereby obtaining the active energy ray polymerization initiators (TX4-Z1), (TX4-Z2), (TX4-Z3), (TX4-Z4), (TX4-Z5), (TX4-Z6), and (TX4-Z7) of Examples 10 to 16.

Examples 17 to 52

Each of the precursors (TX5) to (TX40) and 2-(dimethylamino)ethanol (Z1) as tertiary amine (Z) were mixed in an equal mole. The active energy ray polymerization initiators (TX5-Z1) and (TX40-Z1) of Examples 17 to 52 were thus obtained.

Comparative Examples 1 to 4

The active energy ray polymerization initiator (Ref-1) of Comparative Synthesis Example 1 was determined as the active energy ray polymerization initiator of Comparative Example 1.

The active energy ray polymerization initiator (Ref-2) of Comparative Synthesis Example 2 was determined as the active energy ray polymerization initiator of Comparative Example 2.

The active energy ray polymerization initiator (Ref-3) of Comparative Synthesis Example 3 was determined as the active energy ray polymerization initiator of Comparative Example 3.

2-Hydroxy-2-methyl-1-phenylpropane-1-one, manufactured by TOKYO CHEMICAL INDUSTRY CO., LTD., defined as the active energy ray polymerization initiator (Ref-4), was determined as the active energy ray polymerization initiator of Comparative Example 4.

Evaluation on Active Energy Ray Polymerization Initiator Absorption Spectrum

The active energy ray polymerization initiator TX1-Z1 was dissolved in methylene chloride at 50 ppm. The absorption spectrum was measured by a spectrophotometer V-680 for UV, visible light, and near IR, manufactured by JASCO Corporation. The results are shown in FIG. 1.

The absorption spectra of the active energy ray polymerization initiators Ref-1, Ref-2, and Ref-4 were measured as described above. The results are shown in FIGS. 2, 3, and 4.

Figure 2:
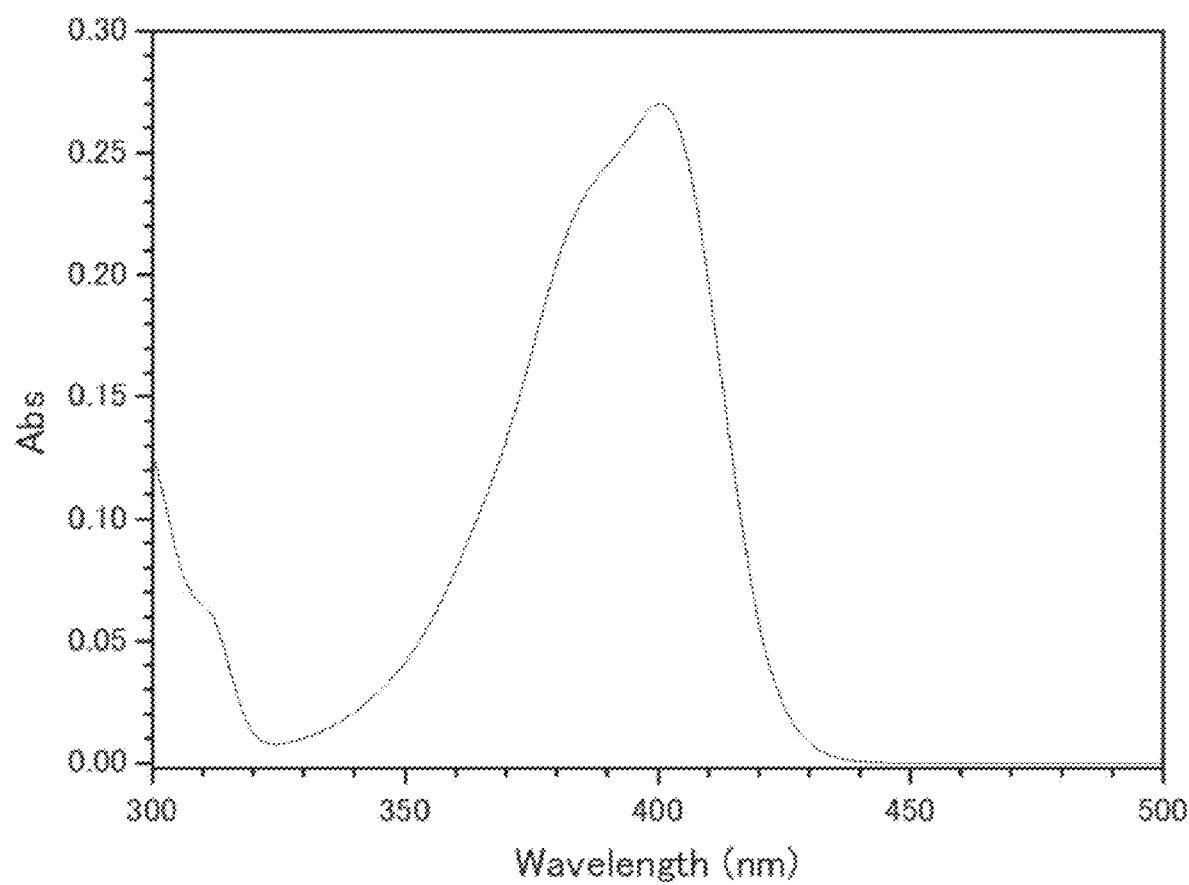
FIG. 2 is a graph illustrating an example of absorption spectrum of a common active energy ray polymerization initiator.

As seen in FIGS. 1 and 2, the active energy ray polymerization initiator TX1-Z1 and the active energy ray polymerization initiator Ref-1 fully absorb light having a wavelength of 400 nm or less so that they support an LED light source of 365 nm, 385 nm, and 395 nm.

Figure 3:
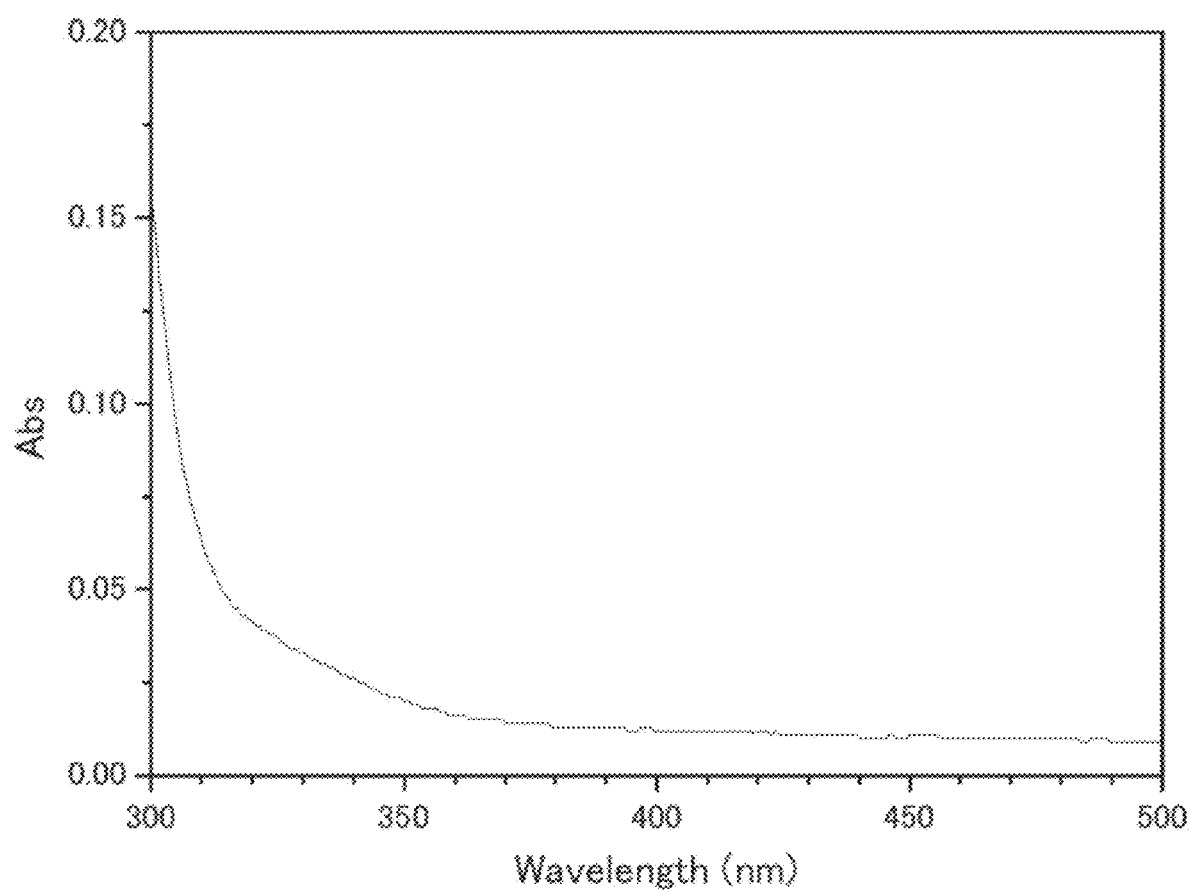
FIG. 3 is a graph illustrating an example of absorption spectrum of a common active energy ray polymerization initiator.

On the other hand, although the active energy ray polymerization initiator Ref-2 absorbs light having a wavelength of 400 nm or less as shown in FIG. 3, the degree of absorption is far below compared to TX1-Z1. Ref-2 does not support an LED light source of 365 nm, 385 nm, and 395 nm.

Figure 4:
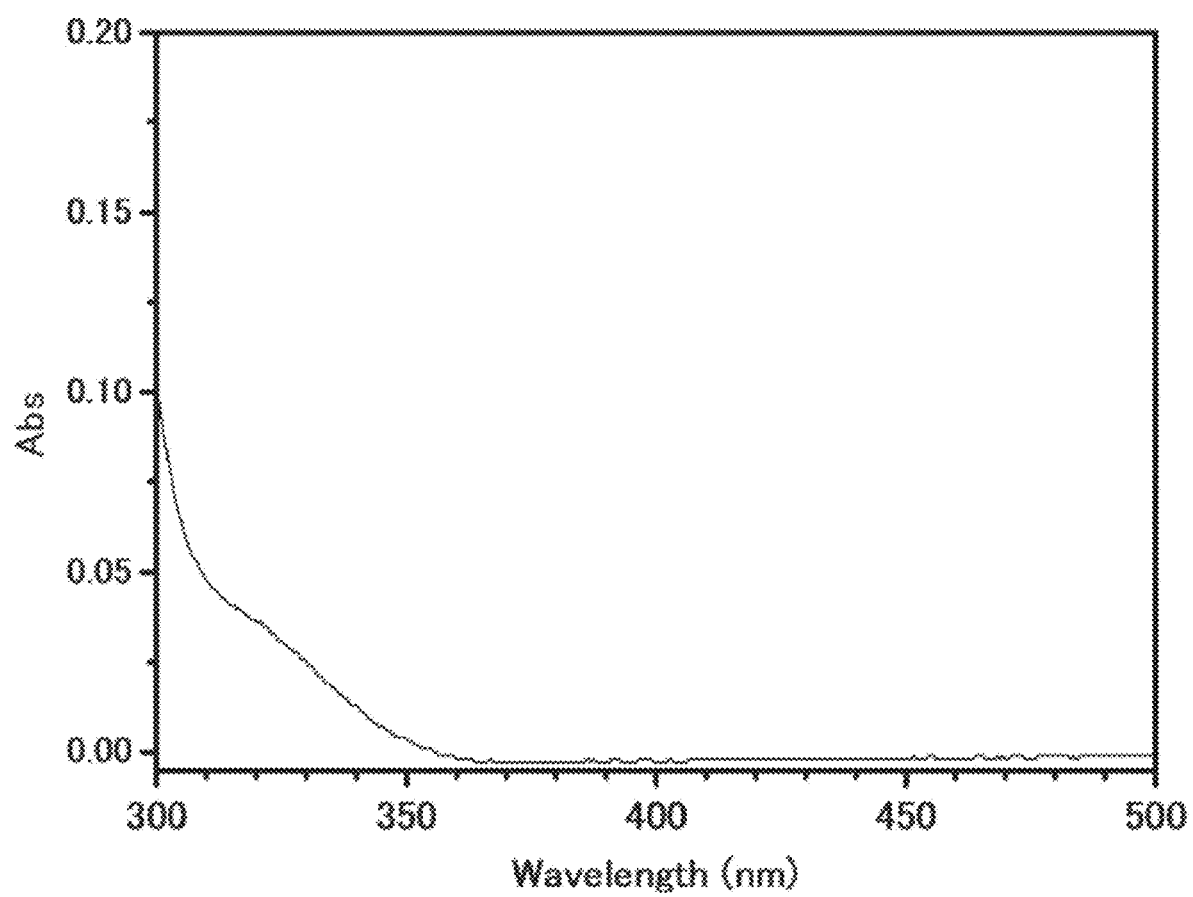
FIG. 4 is a graph illustrating an example of absorption spectrum of a common active energy ray polymerization initiator.

As seen in FIG. 4, the active energy ray polymerization initiator Ref-4 does not absorb light having a wavelength of 350 nm or greater at all. Ref-2 does not support an LED light source of 365 nm, 385 nm, and 395 nm.

Reactivity (Sensitivity)

The active energy ray polymerization initiators were analyzed and evaluated using a highly sensitive differential scanning calorimeter, DSC 7020, manufactured by SII Nano Technology Inc., equipped with a 365 nm UV-LED irradiator, LIGHTINGCURE$^{trademark}$ LC-L1, manufactured by Hamamatsu Photonics K.K., a 385 nm UV-LED irradiator, UV-LED LIGHT SOURCE EXECURE-H-1VCII, manufactured by HOYA Corporation, or a 395 nm UV-LED irradiator, JOL-1205 AIT.

The active energy ray polymerization initiators (TX1-Z1) to (TX40-Z1) of Examples 1 to 52 or the active energy ray polymerization initiators (Ref-1) to (Ref-4) of Comparative Examples 1 to 4, N-vinyl acetoamide, manufactured by TOKYO CHEMICAL INDUSTRY CO., LTD., deionized water, and 3-methoxy-N,N-dimethyl propaneamide were mixed at 5:35:30:30 on a mass basis. Thereafter, 10 mg of the mixture obtained was weighed on an aluminum pan and exposed to UV of 365 nm, 385 nm, or 395 nm at 20 mW/cm$^2$ at room temperature for 30 seconds. The maximum heat energy (Hmax mW/mg) and the time (Tmax seconds) taken before the energy reached Hmax were measured.

As seen in the results shown in Table 2, the active energy ray polymerization initiators of Examples support UV having each wavelength compared to the active energy ray polymerization initiators of Comparative Examples.

Water Solubility

The active energy ray polymerization initiators (TX1-Z1) to (TX40-Z1) of Examples 1 to 52 or the active energy ray polymerization initiators (Ref-1) to (Ref-4) of Comparative Examples 1 to 4 were added to a liquid mixture of deionized water and methanol at 1:1 on a mass basis to evaluate the water solubility in the following manner.

A: 5 percent by mass or more dissolved in liquid mixture

B: 1.5 to less than 5 percent by mass dissolved in liquid mixture

C: 0.5 to less than 1.5 percent by mass dissolved in liquid mixture

D: Less than 0.5 percent by mass dissolved in liquid mixture

As seen in the results shown in Table 2, the active energy ray polymerization initiators of Examples demonstrate more soluble to water than the active energy ray polymerization initiators of Comparative Examples.

TABLE 2

| Example | Precursor of active energy ray polymerization initiator | Z (tertiary amine) | Active energy ray polymerization initiator | 365 nm Hmax (mW/mg) | 365 nm Tmax (sec) | 385 nm Hmax (mW/mg) | 385 nm Tmax (sec) |
|---|---|---|---|---|---|---|---|
| Example 1 | TX1 | Z1 | TX1-Z1 | 5.8 | 4.6 | 5.8 | 4.6 |
| Example 2 | TX1 | Z2 | TX1-Z2 | 5.8 | 4.7 | 5.8 | 4.7 |
| Example 3 | TX1 | Z3 | TX1-Z3 | 5.7 | 4.7 | 5.7 | 4.7 |
| Example 4 | TX1 | Z4 | TX1-Z4 | 5.6 | 4.6 | 5.7 | 4.7 |
| Example 5 | TX1 | Z5 | TX1-Z5 | 5.8 | 4.7 | 5.8 | 4.7 |
| Example 6 | TX1 | Z6 | TX1-Z6 | 5.8 | 4.6 | 5.8 | 4.7 |
| Example 7 | TX1 | Z7 | TX1-Z7 | 5.7 | 4.7 | 5.8 | 4.7 |
| Example 8 | TX2 | Z1 | TX2-Z1 | 5.5 | 4.7 | 5.6 | 4.7 |
| Example 9 | TX3 | Z1 | TX3-Z1 | 5.4 | 4.8 | 5.4 | 4.9 |
| Example 10 | TX4 | Z1 | TX4-Z1 | 5.4 | 4.6 | 5.4 | 4.7 |
| Example 11 | TX4 | Z2 | TX4-Z2 | 5.4 | 4.6 | 5.4 | 4.6 |
| Example 12 | TX4 | Z3 | TX4-Z3 | 5.5 | 4.6 | 5.5 | 4.6 |
| Example 13 | TX4 | Z4 | TX4-Z4 | 5.5 | 4.6 | 5.5 | 4.7 |
| Example 14 | TX4 | Z5 | TX4-Z5 | 5.4 | 4.6 | 5.5 | 4.6 |
| Example 15 | TX4 | Z6 | TX4-Z6 | 5.4 | 4.7 | 5.4 | 4.7 |
| Example 16 | TX4 | Z7 | TX4-Z7 | 5.4 | 4.7 | 5.5 | 4.7 |
| Example 17 | TX5 | Z1 | TX5-Z1 | 5.1 | 4.9 | 5.2 | 4.9 |
| Example 18 | TX6 | Z1 | TX6-Z1 | 5.0 | 5.0 | 5.1 | 5.1 |
| Example 19 | TX7 | Z1 | TX7-Z1 | 5.6 | 4.6 | 5.7 | 4.6 |
| Example 20 | TX8 | Z1 | TX8-Z1 | 5.6 | 4.6 | 5.7 | 4.6 |
| Example 21 | TX9 | Z1 | TX9-Z1 | 5.7 | 4.7 | 5.7 | 4.7 |
| Example 22 | TX10 | Z1 | TX10-Z1 | 5.4 | 4.7 | 5.5 | 4.8 |
| Example 23 | TX11 | Z1 | TX11-Z1 | 5.5 | 4.6 | 5.5 | 4.6 |
| Example 24 | TX12 | Z1 | TX12-Z1 | 5.5 | 4.6 | 5.5 | 4.7 |
| Example 25 | TX13 | Z1 | TX13-Z1 | 5.5 | 4.6 | 5.5 | 4.6 |
| Example 26 | TX14 | Z1 | TX14-Z1 | 5.3 | 4.7 | 5.4 | 4.7 |
| Example 27 | TX15 | Z1 | TX15-Z1 | 5.8 | 4.6 | 5.8 | 4.6 |
| Example 28 | TX16 | Z1 | TX16-Z1 | 5.8 | 4.7 | 5.8 | 4.8 |
| Example 29 | TX17 | Z1 | TX17-Z1 | 4.9 | 5.2 | 5.0 | 5.1 |
| Example 30 | TX18 | Z1 | TX18-Z1 | 5.8 | 4.6 | 5.8 | 4.7 |
| Example 31 | TX19 | Z1 | TX19-Z1 | 5.6 | 4.7 | 5.6 | 4.8 |
| Example 32 | TX20 | Z1 | TX20-Z1 | 5.4 | 4.8 | 5.4 | 4.9 |
| Example 33 | TX21 | Z1 | TX21-Z1 | 5.4 | 4.7 | 5.4 | 4.8 |
| Example 34 | TX22 | Z1 | TX22-Z1 | 5.2 | 4.8 | 5.2 | 4.9 |
| Example 35 | TX23 | Z1 | TX23-Z1 | 5.0 | 5.0 | 5.0 | 5.0 |
| Example 36 | TX24 | Z1 | TX24-Z1 | 5.7 | 4.7 | 5.8 | 4.8 |
| Example 37 | TX25 | Z1 | TX25-Z1 | 5.6 | 4.7 | 5.6 | 4.8 |
| Example 38 | TX26 | Z1 | TX26-Z1 | 5.3 | 4.8 | 5.4 | 4.8 |
| Example 39 | TX27 | Z1 | TX27-Z1 | 5.4 | 4.6 | 5.5 | 4.7 |
| Example 40 | TX28 | Z1 | TX28-Z1 | 5.5 | 4.6 | 5.5 | 4.7 |
| Example 41 | TX29 | Z1 | TX29-Z1 | 5.5 | 4.6 | 5.5 | 4.7 |
| Example 42 | TX30 | Z1 | TX30-Z1 | 5.5 | 4.6 | 5.5 | 4.7 |
| Example 43 | TX31 | Z1 | TX31-Z1 | 5.4 | 4.6 | 5.5 | 4.6 |
| Example 44 | TX32 | Z1 | TX32-Z1 | 5.7 | 4.6 | 5.8 | 4.7 |
| Example 45 | TX33 | Z1 | TX33-Z1 | 5.7 | 4.7 | 5.8 | 4.8 |
| Example 46 | TX34 | Z1 | TX34-Z1 | 4.8 | 5.1 | 4.9 | 5.1 |
| Example 47 | TX35 | Z1 | TX35-Z1 | 5.5 | 4.6 | 5.5 | 4.6 |
| Example 48 | TX36 | Z1 | TX36-Z1 | 5.6 | 4.6 | 5.6 | 4.6 |
| Example 49 | TX37 | Z1 | TX37-Z1 | 5.4 | 4.7 | 5.4 | 4.7 |
| Example 50 | TX38 | Z1 | TX38-Z1 | 5.6 | 4.6 | 5.6 | 4.6 |
| Example 51 | TX39 | Z1 | TX39-Z1 | 5.2 | 4.8 | 5.3 | 4.8 |
| Example 52 | TX40 | Z1 | TX40-Z1 | 5.4 | 4.8 | 5.4 | 4.8 |
| Comparative Example 1 | — | — | Ref-1 | 8.5 | 4.5 | 8.2 | 4.8 |
| Comparative Example 2 | — | — | Ref-2 | 7.8 | 5.5 | 6.5 | 5.8 |
| Comparative Example 3 | — | — | Ref-3 | 6.3 | 4.4 | 6.3 | 4.5 |
| Comparative Example 4 | — | — | Ref-4 | 22.8 | 3.7 | 0 | — |

| Example | Precursor of active energy ray polymerization initiator | Z (tertiary amine) | Active energy ray polymerization initiator | 395 nm Hmax (mW/mg) | 395 nm Tmax (sec) | Water solubility |
|---|---|---|---|---|---|---|
| Example 1 | TX1 | Z1 | TX1-Z1 | 5.8 | 4.7 | A |
| Example 2 | TX1 | Z2 | TX1-Z2 | 5.8 | 4.7 | A |
| Example 3 | TX1 | Z3 | TX1-Z3 | 5.8 | 4.7 | A |
| Example 4 | TX1 | Z4 | TX1-Z4 | 5.7 | 4.7 | A |
| Example 5 | TX1 | Z5 | TX1-Z5 | 5.8 | 4.7 | A |

TABLE 2-continued

| | | | | | | |
|---|---|---|---|---|---|---|
| Example 6 | TX1 | Z6 | TX1-Z6 | 5.8 | 4.7 | A |
| Example 7 | TX1 | Z7 | TX1-Z7 | 5.8 | 4.7 | A |
| Example 8 | TX2 | Z1 | TX2-Z1 | 5.6 | 4.8 | A |
| Example 9 | TX3 | Z1 | TX3-Z1 | 5.4 | 4.9 | A |
| Example 10 | TX4 | Z1 | TX4-Z1 | 5.4 | 4.7 | A |
| Example 11 | TX4 | Z2 | TX4-Z2 | 5.4 | 4.6 | A |
| Example 12 | TX4 | Z3 | TX4-Z3 | 5.5 | 4.7 | A |
| Example 13 | TX4 | Z4 | TX4-Z4 | 5.5 | 4.7 | A |
| Example 14 | TX4 | Z5 | TX4-Z5 | 5.5 | 4.7 | A |
| Example 15 | TX4 | Z6 | TX4-Z6 | 5.4 | 4.7 | A |
| Example 16 | TX4 | Z7 | TX4-Z7 | 5.5 | 4.7 | A |
| Example 17 | TX5 | Z1 | TX5-Z1 | 5.2 | 4.9 | A |
| Example 18 | TX6 | Z1 | TX6-Z1 | 5.1 | 5.1 | A |
| Example 19 | TX7 | Z1 | TX7-Z1 | 5.7 | 4.7 | A |
| Example 20 | TX8 | Z1 | TX8-Z1 | 5.6 | 4.6 | A |
| Example 21 | TX9 | Z1 | TX9-Z1 | 5.6 | 4.7 | A |
| Example 22 | TX10 | Z1 | TX10-Z1 | 5.5 | 4.7 | A |
| Example 23 | TX11 | Z1 | TX11-Z1 | 5.5 | 4.6 | A |
| Example 24 | TX12 | Z1 | TX12-Z1 | 5.5 | 4.7 | A |
| Example 25 | TX13 | Z1 | TX13-Z1 | 5.5 | 4.6 | A |
| Example 26 | TX14 | Z1 | TX14-Z1 | 5.4 | 4.7 | A |
| Example 27 | TX15 | Z1 | TX15-Z1 | 5.8 | 4.7 | A |
| Example 28 | TX16 | Z1 | TX16-Z1 | 5.8 | 4.8 | A |
| Example 29 | TX17 | Z1 | TX17-Z1 | 5.0 | 5.1 | A |
| Example 30 | TX18 | Z1 | TX18-Z1 | 5.8 | 4.7 | A |
| Example 31 | TX19 | Z1 | TX19-Z1 | 5.6 | 4.8 | A |
| Example 32 | TX20 | Z1 | TX20-Z1 | 5.4 | 4.9 | A |
| Example 33 | TX21 | Z1 | TX21-Z1 | 5.4 | 4.8 | A |
| Example 34 | TX22 | Z1 | TX22-Z1 | 5.2 | 4.9 | A |
| Example 35 | TX23 | Z1 | TX23-Z1 | 5.0 | 5.0 | A |
| Example 36 | TX24 | Z1 | TX24-Z1 | 5.8 | 4.8 | A |
| Example 37 | TX25 | Z1 | TX25-Z1 | 5.6 | 4.8 | A |
| Example 38 | TX26 | Z1 | TX26-Z1 | 5.4 | 4.9 | A |
| Example 39 | TX27 | Z1 | TX27-Z1 | 5.4 | 4.7 | A |
| Example 40 | TX28 | Z1 | TX28-Z1 | 5.4 | 4.7 | A |
| Example 41 | TX29 | Z1 | TX29-Z1 | 5.5 | 4.7 | A |
| Example 42 | TX30 | Z1 | TX30-Z1 | 5.5 | 4.7 | A |
| Example 43 | TX31 | Z1 | TX31-Z1 | 5.5 | 4.7 | A |
| Example 44 | TX32 | Z1 | TX32-Z1 | 5.8 | 4.8 | A |
| Example 45 | TX33 | Z1 | TX33-Z1 | 5.8 | 4.8 | A |
| Example 46 | TX34 | Z1 | TX34-Z1 | 4.9 | 5.1 | A |
| Example 47 | TX35 | Z1 | TX35-Z1 | 5.6 | 4.6 | A |
| Example 48 | TX36 | Z1 | TX36-Z1 | 5.6 | 4.6 | A |
| Example 49 | TX37 | Z1 | TX37-Z1 | 5.4 | 4.7 | A |
| Example 50 | TX38 | Z1 | TX38-Z1 | 5.6 | 4.6 | A |
| Example 51 | TX39 | Z1 | TX39-Z1 | 5.3 | 4.8 | A |
| Example 52 | TX40 | Z1 | TX40-Z1 | 5.4 | 4.8 | A |
| Comparative Example 1 | — | — | Ref-1 | 8.5 | 4.5 | D |
| Comparative Example 2 | — | — | Ref-2 | 6.2 | 5.8 | D |
| Comparative Example 3 | — | — | Ref-3 | 6.3 | 4.5 | D |
| Comparative Example 4 | — | — | Ref-4 | 0 | — | C |

In Table 1, Z1 is 2-(dimethylamino)ethanol, Z2 is 2-(dimethylamino)-1-propanol, Z3 is 2-(diethylamino)ethanol, Z4 is 2-[2-(diethylamino)ethoxy]ethanol, Z5 is N-methyldiethanol amine, Z6 is N-ethyldiethanol amine, and Z7 is I-[bis(2-hydroxyethyl)amino]-2-propanol.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:
1. An active energy ray polymerization initiator comprising:
  a structure represented by the Chemical Formula (1) or the Chemical Formula (2) below,

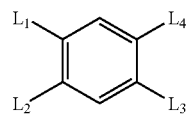

Chemical Formula (1)

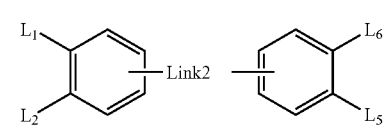

Chemical Formula (2)

where $L_1$ represents a group represented by the following Chemical Formula (I), $L_2$ represents a group represented by the following Chemical Formula (II), one of $L_3$ and $L_4$ represents a same group as $L_1$, a rest of $L_3$ and $L_4$ represents a same group as $L_2$, one of $L_5$ and $L_6$ represents a same group as $L_1$, a rest of $L_5$ and $L_6$ represents a same group as $L_2$, Link 2 represents a single bond, —O—, —CO—, —SO$_2$—, —C(CF$_3$)$_2$—, an aliphatic hydrocarbon group having 1 to 12 carbon atoms, or an aromatic group having 6 to 15 carbon atoms, Chemical Formula (I)

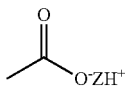

where Z represents a tertiary amine,

Chemical Formula (II)

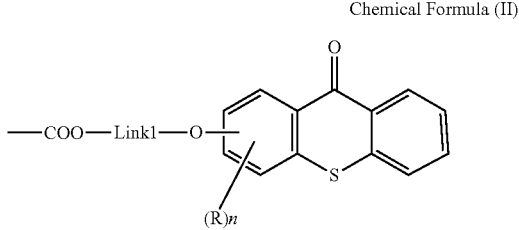

where R represents a hydrocarbon group having one to three carbon atoms or methoxy group, n represents 0 or an integer of from 1 to 3, Link 1 represents —(CH$_2$)$_x$—(OC$_2$H$_4$)$_y$—, where x represents an integer of from 2 to 12 and y represents 0 or an integer of from 1 to 11.

2. The active energy ray polymerization initiator according to claim 1,
wherein —O-Link 1 group in the Chemical Formula (III) is bonded at a site 2, site 3, or site 4 of a thioxanthone structure represented by the following Chemical Formula (II)

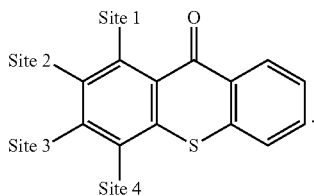

3. An active energy ray curing composition comprising:
the active energy ray polymerization initiator of claim 1.

4. An active energy ray curing ink comprising:
the active energy ray polymerization initiator of claim 1.

5. An aqueous active energy ray curing ink comprising:
the active energy ray polymerization initiator of claim 1.

6. A container containing the active energy ray curing ink of claim 4.

7. An image forming device comprising:
the container of claim 6;
a discharging device configured to discharge the active energy ray curing ink in the container; and
an irradiator configured to expose the active energy ray curing ink that has been discharged to an active energy ray having a peak in a range of wavelength of from 350 to 400 nm.

8. An image forming method comprising:
discharging the active energy ray curing ink of claim 4; and
exposing the active energy ray curing ink that has been discharged to an active energy ray having a peak in a range of wavelength of from 350 to 400 nm.

9. A method of manufacturing the active energy ray polymerization initiator of claim 1, the method comprising:
synthesizing the active energy ray polymerization initiator from a thioxanthone compound represented by the following Chemical Formula (3), an aromatic tetracarboxylic acid, and a tertiary amine, method comprising:

Chemical Formula (3)

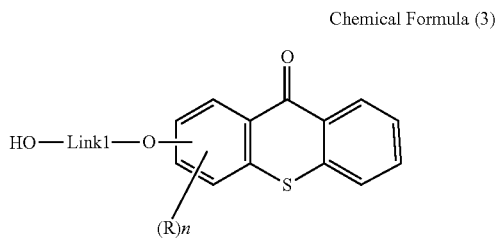

where R represents a hydrocarbon group having one to three carbon atoms or methoxy group, n represents 0 or an integer of from 1 to 3, Link 1 represents —(CH$_2$)$_x$—(OC$_2$H$_4$)$_y$—, where x represents an integer of from 2 to 12 and y represents 0 or an integer of from 1 to 11.

* * * * *